(12) United States Patent
Taylor et al.

(10) Patent No.: US 8,585,954 B2
(45) Date of Patent: Nov. 19, 2013

(54) METHOD AND APPARATUS FOR EMBOSSING A DEFORMABLE BODY

(75) Inventors: Hayden Kingsley Taylor, Singapore (SG); Duane S. Boning, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 40 days.

(21) Appl. No.: 13/017,736

(22) Filed: Jan. 31, 2011

(65) Prior Publication Data

US 2011/0187014 A1  Aug. 4, 2011

Related U.S. Application Data

(63) Continuation-in-part of application No. 12/943,889, filed on Nov. 10, 2010, now abandoned.

(60) Provisional application No. 61/259,860, filed on Nov. 10, 2009.

(51) Int. Cl.
*B27N 3/18* (2006.01)

(52) U.S. Cl.
USPC ........................................................ 264/319

(58) Field of Classification Search
USPC ........................................................ 264/319
See application file for complete search history.

(56) References Cited

U.S. PATENT DOCUMENTS

| | | | |
|---|---|---|---|
| 6,096,247 A | 8/2000 | Ulsh et al. | |
| 7,195,733 B2 | 3/2007 | Rogers et al. | |
| 7,388,178 B2 | 6/2008 | Hennessey | |
| 8,145,457 B2 | 3/2012 | Taylor et al. | |
| 2004/0196481 A1 | 10/2004 | Jacobsen et al. | |
| 2005/0224725 A1 | 10/2005 | Menon et al. | |
| 2007/0089495 A1 | 4/2007 | Plona | |
| 2007/0166557 A1 | 7/2007 | Keil et al. | |
| 2008/0000375 A1 | 1/2008 | Nielsen et al. | |
| 2009/0050487 A1 | 2/2009 | Fang et al. | |

FOREIGN PATENT DOCUMENTS

WO   2011060102   5/2011

OTHER PUBLICATIONS

Ames, Nicoli Margaret, "A Thermo-Mechanical Finite Deformation Theory of Plasticity for Amorphous Polymers: Application to Micro-Hot-Embossing of Poly(Methyl Methacrylate)," Unpublished doctoral dissertation, Massachusetts Institute of Technology, (Jun. 2.

Arruda, E.M., et al., "Effects of strain rate, temperature and thermomechanical coupling on the finite strain deformation of glassy polymers," Mech. Mater., 19:193-212 (1995).

Cai, S. and Bhushan, B., "A numerical three-dimensional contact model for rough, multilayered elastic/plastic solid surfaces," Wear, 259:1408-1423 (2005).

Dirckx, M., et al., "High-temperature de-molding for cycle time reduction in hot embossing," ANTEC, 2972-2976 (2007).

Dirckx, Matthew E., "Design of a fast cycle time hot micro-embossing machine," Unpublished master's thesis, Massachusetts Institute of Technology, Cambridge, Massachusetts (Jun. 2005).

(Continued)

*Primary Examiner* — Larry Thrower
(74) *Attorney, Agent, or Firm* — Hamilton, Brook, Smith & Reynolds, P.C.

(57) ABSTRACT

A deformable body is embossed using a stamp as a function of a pressure distribution. The pressure distribution is obtained by running a deformation model determined based on convolving a contact pressure distribution with a mechanical response of a surface topography of the deformable body and convolving the pressure distribution with a point load response of the stamp.

19 Claims, 18 Drawing Sheets

(56) References Cited

OTHER PUBLICATIONS

Duffy, D.C., et al., "Rapid Prototyping of Microfluidic Systems in Poly(dimethylsiloxane)," Anal. Chem., 70(23):4974-4984 (1998).
Guo, Y., et al., "Study of the demolding process—implications for thermal stress, adhesion and friction control," J Micromech Microengineering, 17:9-19 (2007).
Hirai, Y., et al., "Pressure and resist thickness dependency of resist time evolutions profiles in nanoimprint lithography," Microelectronic Engineering, 85:842-845 (2008).
Hirai, Y., et al., "Simulation and experimental study of polymer deformation in nanoimprint lithography," J. Vac. Sci. Technol. 22(6):3288-3293 (Nov./Dec. 2004).
Huang, C.K., "Polymeric nanofeatures of 100 nm using injection moulding for replication," J Micromech Microengineenng, 17:1518-1526 (2007).
Juang, Y.J. et al., "Hot embossing in microfabrication. Part II: Rheological characterization and process analysis," Polym. Eng. Sci., 42(3):551-566 (2002).
Kehagias, N., et al., "Residual layer thickness in nanoimprint: experiments and coarse-grain simulation," Microelectronic Engineering, 85:846-849 (2008).
Lei, K.F., et al., "Effects of contact-stress on hot-embossed PMMA microchannel wall profile," Microsystem Tecnologies, 11:353-357 (2005).
Lin, C.-R, et al., "The characterisation and finite-element analysis of a polymer under hot pressing," Int J Adv Manuf Technol, 20:230-235 (2002).
Makela, T., et al., "Continuous roll to roll nanoimprinting of inherently conducting polyaniline," Microelectronic Engineering, 84: 877-879 (2007).
Nogi, T., and Kato, T., "Influence of a hard surface layer on the limit of elastic contact—Part I: Analysis using a real surface model," Journal of Tribology, Transactions of the ASME, 119:493-500 (1997).
Peng, W. and Bhushan, B., "A numerical three-dimensional model for the contact of layered elastic/plastic solids with rough surfaces by a variational principle," Journal of Tribology, 123:330-342 (2001).
Polonsky, I.A. and Keer, L.M., "A numerical method for solving rough contact problems based on the multi-level multi-summation and conjugate gradient techniques," Wear, 231:206-19 (1999).
Polonsky, I.A. and Keer, L.M., "Fast methods for solving rough contact problems: a comparative study," Transactions of the ASME. Journal of Tribology, 122:36-41 (2000).
Rowland, H.D., et al., "Impact of polymer film thickness and cavity size on polymer flow during embossing: Toward process design rules for nanoimprint lithography," J Micromech Microengineering, 15:2414-2425 (2005).
Rowland, H.D., et al., "Simulations of nonuniform embossing: The effect of asymmetric neighbor cavities on polymer flow during nanoimprint lithography," J. Vac. Sci. Technol. 23(6):2958-2962 (Nov./Dec. 2005).
Scheer, H-C., "Polymer time constants during low temperature nanoimprint lithography," J. Vac. Sci. Technol., 23(6):2963-2966 (Nov./Dec. 2005).
Sirotkin, V., et al., "Coarse-grain method for modeling of stamp and substrate deformation in nanoimprint," Microelectronic Engineering, 84:868-71 (2007).
Sirotkin, V., et al., "Coarse-grain simulation of viscous flow and stamp deformation in nanoimprint," Journal of Vacuum Science and Technology B: Microelectronics and Nanometer Structures, 25:2379-2383 (2007).
Sirotkin, V., et al., "Viscous flow simulation in nanoimprint using coarse-grain method," Microelectronic Engineering, 83:880-883 (2006).
Takagi, H., et al., "Analysis of time dependent polymer deformation based on a viscoelastic model in thermal imprint process," Microelectronic Engineering, 85:902-906 (2008).
Tan, H., et al., "Roller nanoimprint lithography," J. Vac. Sci. Technol., 16(6):3926-3928 (Nov./Dec. 1998).
Taylor, H., et al., "Computationally efficient modelling of pattern dependencies in the micro-embossing of thermoplastic polymers," Microelectronic Engineering, 85:1453-1456 (2008).
Wang, F. and Keer, L.M., "Numerical simulation for three dimensional elastic-plastic contact with hardening behavior," Transactions of the ASME. Journal of Tribology, 127:494-502, 07 (2005).
Williams, M.L., et al., "The temperature dependence of relaxation mechanisms in amorphous polymers and other glass-forming liquids," J. Am. Chem. Soc., 77:3701-3707 (1955).
Worgull, M., et al., "Modeling and optimization of the hot embossing process for micro- and nanocomponent fabrication," J. Microlith. , Microfab. , Microsyst., 5(1):011005-1-011005-13 (Jan.-Mar. 2006).
Xie, Xiaolin, "Physical Understanding and Modeling of Chemical Mechanical Planarization in Dielectric Materials," Unpublished doctoral dissertation, Massachusetts Institute of Technology (Jun. 2007).
Young, W-B, "Analysis of the nanoimprint lithography with a viscous model," Microelectronic Engineering, 77:405-411 (2005).
Nogi, et al., "Influence of a Hard Surface Layer on the Limit of Elastic Contac—Part 1: Analysis Using a Real Surface Model," Journal of Tribology, Transactions of the ASME, vol. 119, pp. 493-500 (Jul. 1997).
Notification of Transmittal of the International Search Report and the Written Opinion of the International Searching Authority, or the Declaration for PCT/US2010/056275. Date mailed: Mar. 10, 2011.
Taylor, et al., "Modeling and Simulation of Stamp Deflections in Nanoimprint Lithography: Exploiting Backside Grooves to Enhance Residual Layer Thickness Uniformity," Microelectronic Engineering 7630, 4 pages (Jan. 7, 2011).
Taylor, et al., "Towards Nanoimprint Lithography-Aware Layout Design Checking," Proc. of SPIE, vol. 7641, pp. 76410U-1 through 76410U-12 (Apr. 2, 2010).
Pedersen, R.H., et al., "Quantitative Strategies to Handle Stamp Bending in NIL," Proc. Nanoimprint and Nanoprint Technology (2005).
Lee, J.K. and Han, C.D., "Evolution of Polymer blend Morphology During Compounding in an Internal Mixer," Polymer 40:6277-6296 (1999).
Gao, H., et al., "Air Cushion Press for Excellent Uniformity, High Yield, and Fast Nanoimprint Across a 100 mm Field," Nano Letters 6(11):2438-2441 (2006).
Deguchi, K., et al., "Evaluation of Pressure Uniformity Using a Pressure-Sensitive Film and Calculation of Wafer Distortions Caused by Mold Press in Imprint Lithography," Japanese Journal of Applied Physics, Part 1 No. 6B 41:4178-4181 (2002).
Timoshenko, S., Theory of Plates and Shells, New York: McGraw-Hill, pp. 222-231 (1959).
Reddy, J.N. , Theory and Analysis of Elastic Plates and Shells, Boca Raton, FLA: CRC, pp. 214-293 (2007).
Suh, D., et al., "Rigiflex Lithography for Nanostructure Transfer," Advanced Materials 17:1554-1560 (2005).
McClelland, G., et al., "Contact Mechanics of a Felxible Imprinter for Photocured Nanoimprint Lithography," Tribology Letters 19(1):59-63 (2003).
Pedersen, R.H., et al., "A Compact System for Large-Area Thermal Nanoimprint Lighography Using Smart Stamps," Journal of Micromechanics and Microengineering 18:1-9 (2008).
Hocheng, H. and Hsu, W.H., "Effect of Back Mold Grooves on Improving Uniformity in Nanoimprint Lithography," Japanese Journal of Applied Physics 46(9B):6370-6372 (2007).
Colburn, M., et al., "Patterning Nonflat Substrates with a Low Pressure, Room Temperature, Imprint Lithography Process," Journal of Vacuum Science and Technology B, 19(16):2162-2172 (2001).

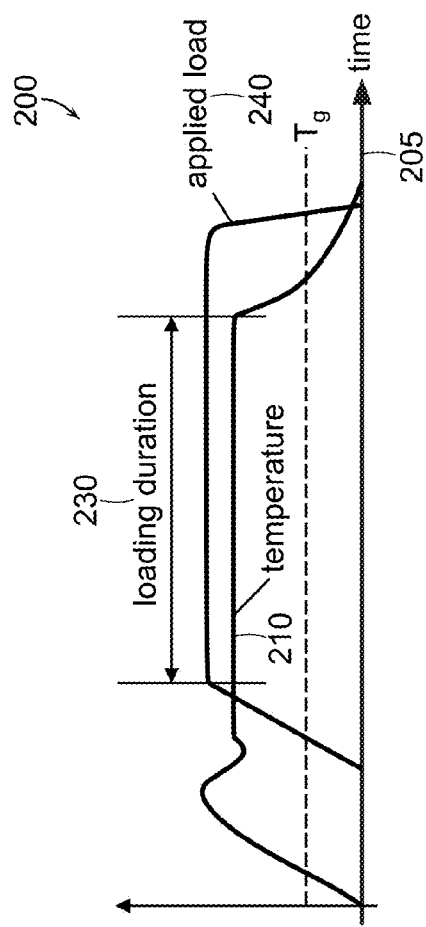
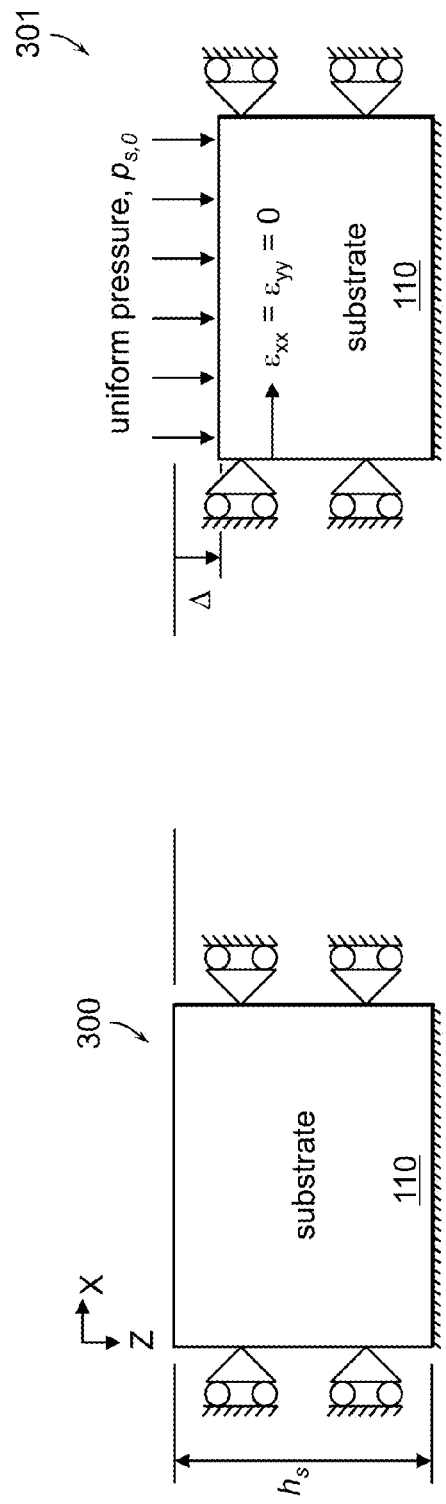

|  | Experiment | Simulation |
|---|---|---|
| Long rectangular cavities ∥ x | ▲—510 | ⋯⋯ 530 |
| Long rectangular cavities ∥ y | ●—520 | ---- 540 |
| Square cavities | □ | —— 550 |

| Type of polymer model | Possible uses | Compliance function $J(t)$ in response to step-load applied for all $t > 0$ | $\dfrac{dJ(t)}{dt}$ (defined for $t \geq 0$) |
|---|---|---|---|
| Purely elastic 610 | Simulating deformations of stamp and/or the substrate underlying an embossed layer of finite thickness | $\dfrac{1}{E}$ | $\dfrac{\delta(t)}{E}$ |
| Newtonian liquid 620 | Molten polymers; very low molecular-weight polymers; nanoimprint lithography | $\dfrac{t}{\eta}$ | $\dfrac{1}{\eta}$ |
| Maxwell model 630 | Low molecular-weight viscoelastic polymers | $\dfrac{t}{\eta} + \dfrac{1}{E}$ | $\dfrac{1}{\eta} + \dfrac{\delta(t)}{E}$ |
| Kelvin-Voigt model 640 | Higher molecular-weight polymers whose behavior is dominated by physical entanglements of the polymer chains | $\dfrac{1}{E}\left[1 - \exp\left(\dfrac{-Et}{\eta}\right)\right]$ | $\dfrac{1}{\eta}\left[\exp\left(\dfrac{-E(t)}{\eta}\right)\right]$ |
| Hybrid Maxwell/Voigt model (Voigt model in series with Maxwell model) 650 | Modeling of classes of polymers with variable molecular weight; in general, representing more phenomena than the above models allow | $\dfrac{1}{E_1}\left[1 - \exp\left(\dfrac{-E_1 t}{\eta_1}\right)\right] + \dfrac{t}{\eta_2} + \dfrac{1}{E_2}$ | $\dfrac{1}{\eta_1}\left[\exp\left(\dfrac{-E_1 t}{\eta_1}\right)\right] + \dfrac{1}{\eta_2} + \dfrac{\delta(t)}{E_2}$ |

FIG. 6

| m | 1 | 3 | 5 | 7 |
|---|---|---|---|---|
| $Q_m$ | -0.3722 | 0.0380 | 0.0178 | 0.0085 |
| $R_m$ | -0.1025 | 0.0263 | 0.0042 | 0.0015 |

| Quantity | Meaning | Initial value |
|---|---|---|
| $r_1[m,n]$ | Residual layer thickness | $r_0$ everywhere |
| $w_{die,1}[m,n]$ | Die-scale layer deformation | 0 everywhere |
| $w_{local,1}[m,n]$ | Local layer deformation associated with filling of the fine-featured topography | 0 everywhere |
| $S_1[m,n]$ | Switch that determines whether filling of fine-topography cavities is squeeze-dominated (value is 1) or dominated by bulk deformation of material (value is 0). | 1 everywhere |
| $k_{die,1}[m,n]$ | Local thickness-correction factor | 1 everywhere (layer thickness begins uniform) |
| $p_{g,1}[m,n]$ | Contact pressure-compliance integral | 0 everywhere ($p_{g,0}$ ramps up from zero) |
| $\Delta_1$ | Reference displacement of stamp | 0 everywhere |
| $C$ | Contact set | 1 where $w_{stamp}$ is equal to its minimum value across the whole stamp; 0 otherwise |

FIG. 12

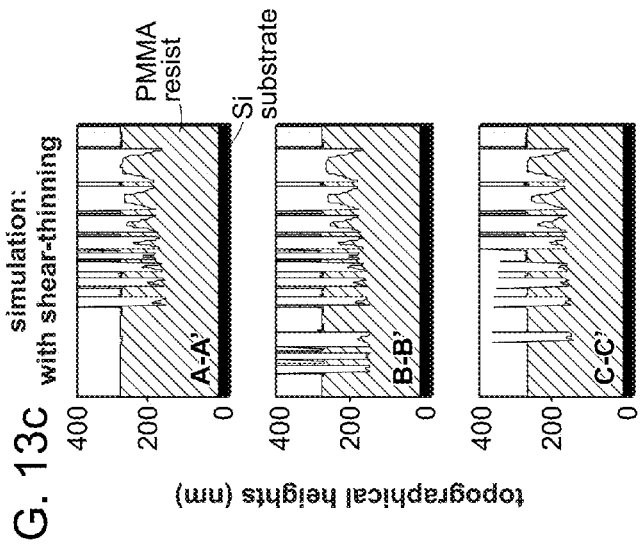
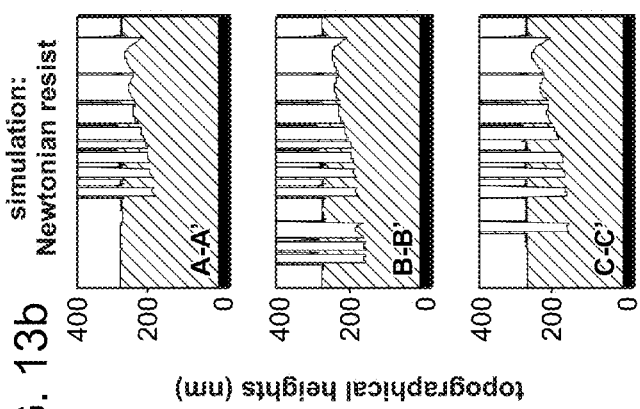
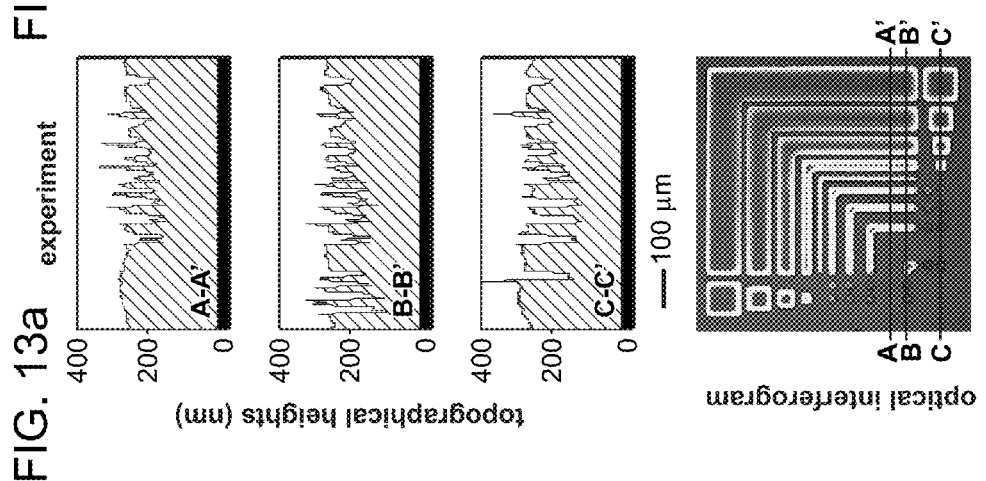
FIG. 13a experiment
FIG. 13b simulation: Newtonian resist
FIG. 13c simulation: with shear-thinning

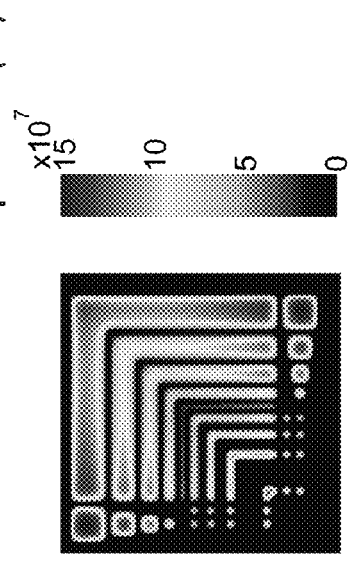
FIG. 15a  time = 20 s
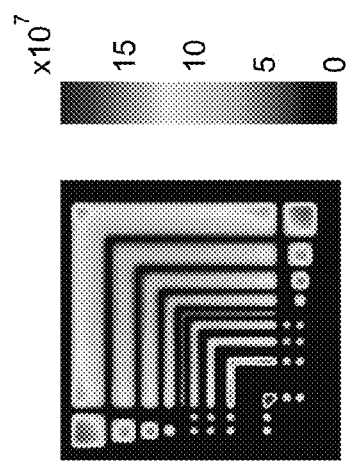
FIG. 15b  time = 60 s
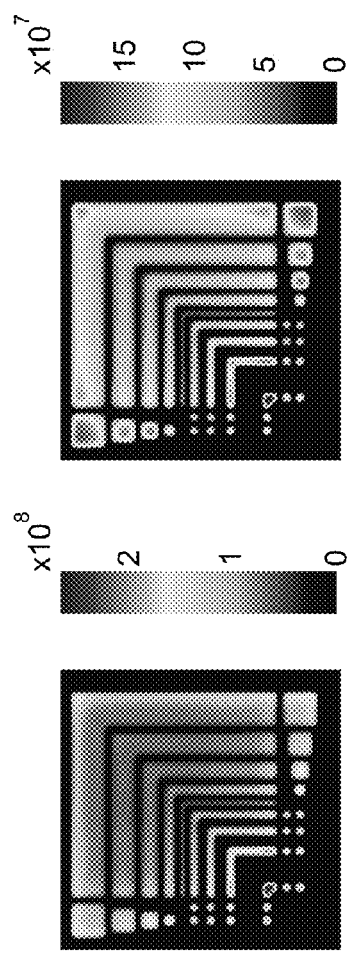
FIG. 15c  time = 120 s  Contact pressure (Pa)
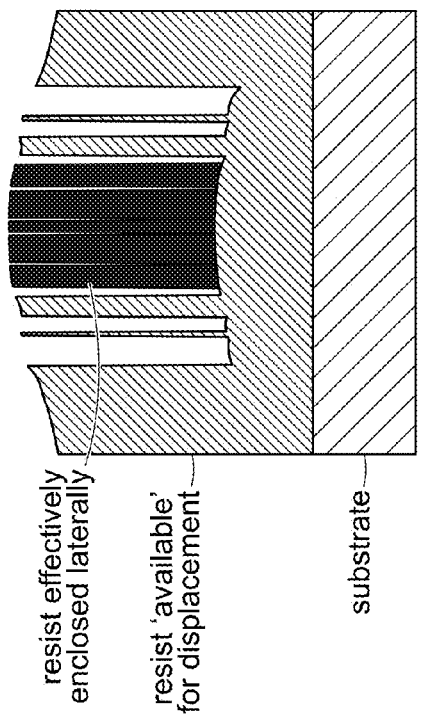
FIG. 16
resist effectively enclosed laterally
resist 'available' for displacement
substrate FIG. 17a
FIG. 17b
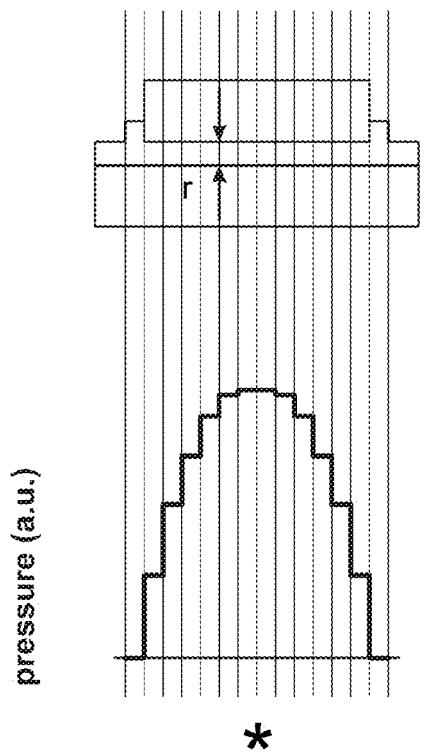
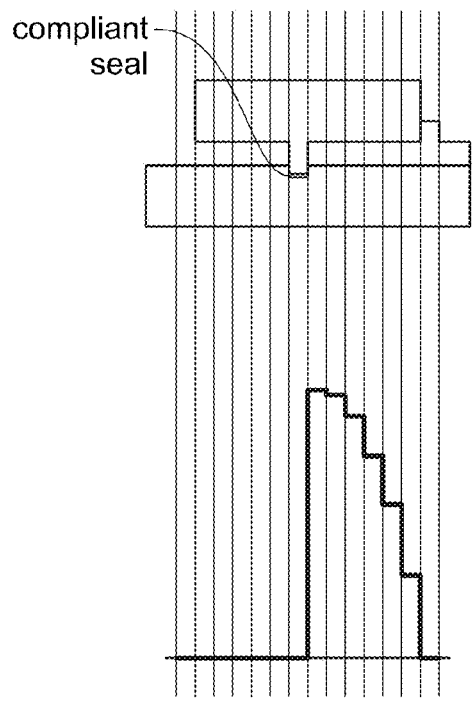
compliant seal
pressure (a.u.)
*
$g[n]$
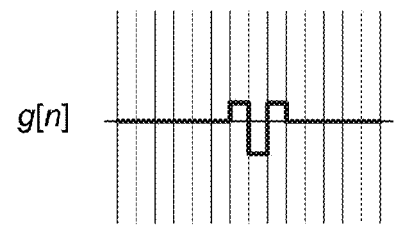
$g_A[n]$
$k_A[n]$
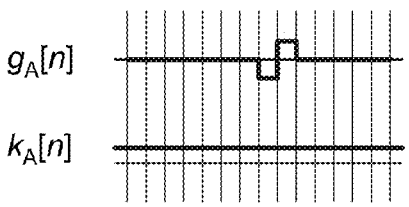
=
$g_B[n]$
$k_B[n]$
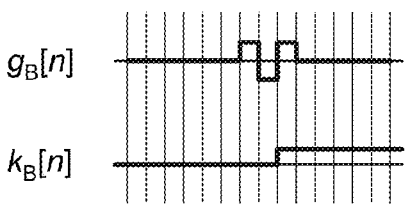
$r[n]$
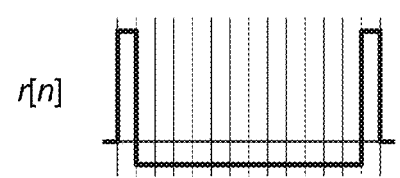
$r[n]$
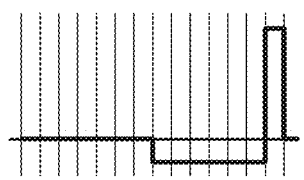

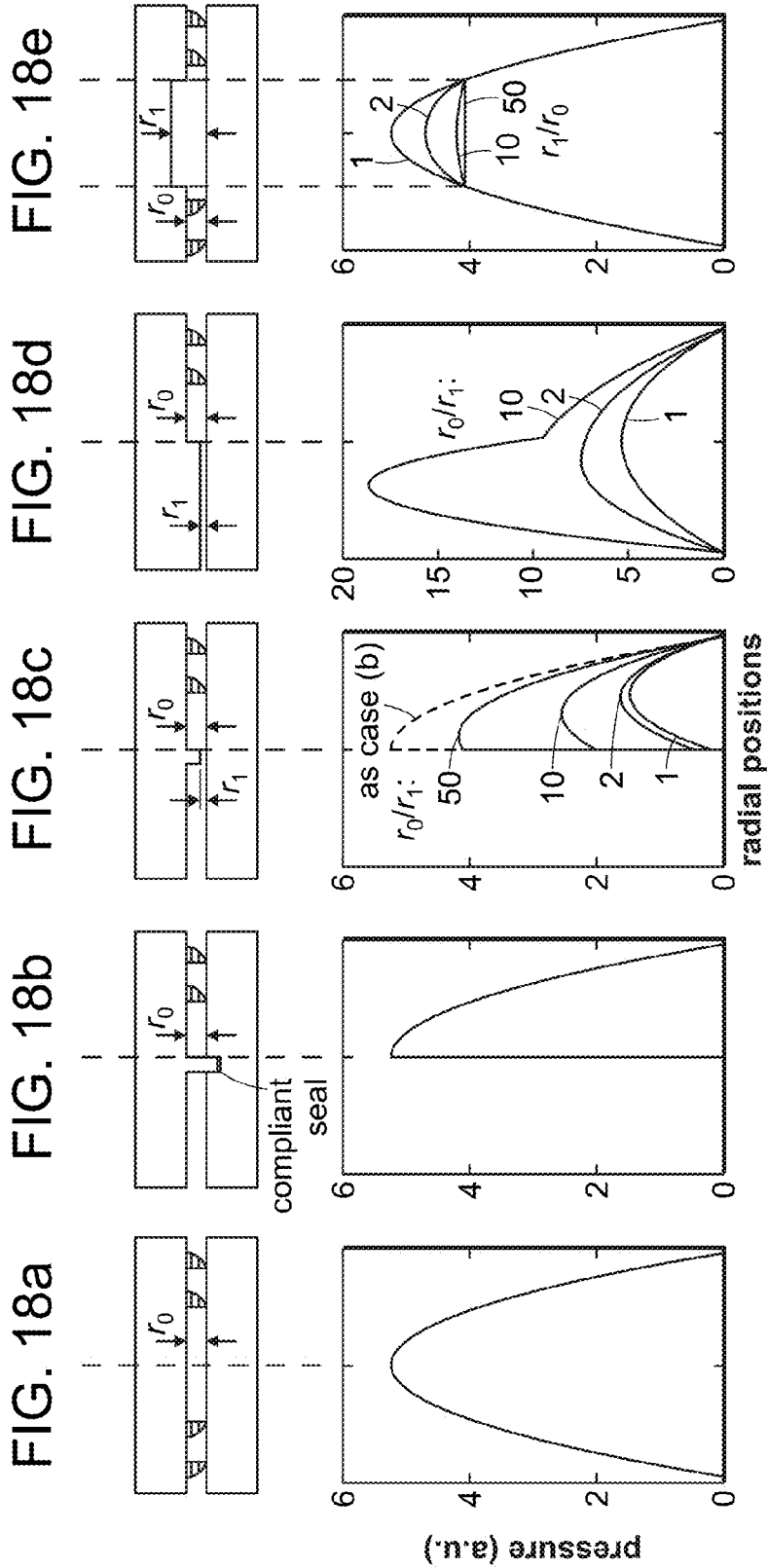

METHOD AND APPARATUS FOR EMBOSSING A DEFORMABLE BODY

RELATED APPLICATIONS

This application is a continuation-in-part of U.S. application Ser. No. 12/943,889, filed Nov. 10, 2010 now abandoned, which claims the benefit of U.S. Provisional Application No. 61/259,860, filed on Nov. 10, 2009.

The entire teachings of the above applications are incorporated herein by reference.

BACKGROUND

The hot embossing of thermoplastic polymers has attracted attention as a promising microfabrication process. Hot embossing has certain advantages over other polymer microfabrication processes. The micro-casting of curable liquid resins, which is a process that is used with elastomers such as polydimethylsiloxane (PDMS), is widely known as soft lithography (1) and is ideal for prototyping small numbers of devices. Unfortunately, considerable manual skill is required to handle the highly flexible components produced.

Available techniques for automating soft lithography have so far proved largely elusive. One example of such methods is injection molding. Injection molding may be used to form microscopic features (2) and can easily be automated, but tooling and equipment costs associated with this method are relatively high.

Finite-element numerical modeling of thermoplastic embossing has also received attention in the art. For example, patterning of sub-micrometer-thickness polymeric layers, as encountered in nano-imprint lithography, has been considered (8-14). The embossed material has variously been described using models such as Newtonian liquid (8, 9, 14), shear-thinning liquid (8, 15), linear-elastic (11), Mooney-Rivlin rubber-elastic model (10, 16), and linear (12, 13) or non-linear (17, 18) visco-elastic models. Other thermomechanically-coupled finite-deformation material models have also been developed (19, 20) and applied to simulate the micro-embossing of bulk polymeric substrates (20). However, finite-element approaches, although capable of capturing many of the physical phenomena observed, are currently too computationally costly to extend to the feature-rich patterns of complete devices.

For the simulation of nanoimprint lithography, Zaitsev, et al. (22) have proposed a simplified "coarse-grain" approach in which the imprinted polymeric layer is modeled as a Newtonian fluid and the pattern of the stamp is represented by a matrix of cells, where each is assumed to contain features of a single size and packing density (21-25).

Efficient numerical simulations of the deformations of elastic (26, 27) and elastic-plastic (28-30) bodies, which may be rough and/or multi-layered (26, 29, 30), have also been considered in tribology. These simulations, in the elastic-plastic cases, rely on a description of the deformation of the material's surface in response to a point-load together with a criterion for yielding of the material. The overall topography of the material's surface is calculated by spatially convolving an iteratively-found contact pressure distribution with the point-load response. Sub-surface stresses can similarly be estimated by convolving contact pressures with appropriate kernel functions (27). The convolution itself may be effected using fast Fourier transforms (26, 28, 29) or other summation methods (31, 32). The solution for the contact-pressure distribution may successfully be obtained using iterative conjugate-gradient methods combined with kinematic constraints on the surface deformation (26, 28, 32) or by using methods that seek a minimum of elastic potential energy in the layer (29).

The validity of these contact mechanics-based approaches is limited to cases where surface curvatures remain small and all deflections are a small proportion of any layer's thickness. These linear methods have nevertheless proved to be of great value because of the fast computation that is possible. Lei, et al. suggest using such an approach to represent the micro-embossing of thick, rubbery polymeric layers (33). They develop an approximate analytical expression for the shape of the deformed surface of such a layer when embossed with a simple trench, and show rough agreement between that expression and the measured topography of polymethylmethacrylate layers embossed under a small set of processing conditions.

SUMMARY

Certain aspects of the present invention relate to a method and corresponding apparatus for embossing a deformable body with a stamp that runs a deformation model determined based on convolving a contact pressure distribution with a mechanical response of a surface topography of the deformable body and convolving the pressure distribution with a point load response of the stamp and embosses the deformable body using the stamp as a function of the deformation model.

Yet another aspect of the present invention relates to a method and corresponding apparatus for embossing a deformable body with a stamp that runs a deformation model determined based on convolving a contact pressure distribution and a point load response. The point load response may be an anisotropic function. The deformable body may be embossed using the stamp as a function of the deformation model.

The point load response may be determined based on deflections of the stamp. The deformable body may include a polymeric layer comparable in thickness to lateral dimensions of features being embossed. The deformable body may include a polymeric layer being of thickness substantially less than lateral dimensions of features being embossed. The deformable body includes a deformable layer on a substrate. The deformable layer may be unitary with the substrate, be bounded with the substrate, or be mechanically supported on the substrate.

The deformation model may further be obtained by convolving the contact pressure distribution with a point load response of the substrate.

The contact pressure distribution may be determined based on stamp indentation and substrate indentation. The contact pressure distribution may be determined based on deformations of a layer of the deformable body. The contact pressure distribution may be determined based on a zero-mean pressure distribution needed to bring all surfaces of the layer of the deformable body into contact with the stamp. The contact pressure distribution may be determined based on a zero-mean pressure distribution needed for an incremental displacement of the stamp into the deformable body. The contact pressure distribution may be determined based on a spatial variation of thickness of the layer of the deformable body or based on the point load response and an average pressure applied to the stamp.

The mechanical response of the surface topography of the deformable body may be anisotropic.

The point load response of the stamp may be determined based on bending and/or indentation of the stamp. The bending of the stamp may be determined using at least one of the thickness and the elasticity of the stamp.

The deformable body may include a polymeric layer thicker than dimensions of features being embossed.

The displacement of material in the deformable body embossed with the stamp may be determined as a function of the point-load-time response, one or more additional properties of the deformable body, and the contact pressure distribution. The one or more additional properties of the deformable body may include at least one of time dependent properties, temperature dependent properties, temperature and time dependent properties, temperature dependent elasticity, or temperature dependent viscosity.

The anisotropic point load response may be obtained using an anisotropy parameter that represents strength of anisotropy of the anisotropic layer of deformable body.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a plot that illustrates a relationship between time, temperature, loading duration, and applied load in hot embossing of thermoplastic polymers.

FIG. 3a is an illustration of representation of global compression of finite-thickness substrates before loading.

FIG. 3b is an illustration of representation of global compression of finite-thickness substrates under uniform applied pressure in the z direction.

FIG. 6 is a table that includes an outline of some possible polymer models and their corresponding compliance functions.

FIG. 12 is a table that includes initial values of variables involved in nanoimprint simulation.

FIGS. 13a-13c illustrate optical micrographs and white-light interferometry cross-sections of test patterns.

FIGS. 15a-15c illustrate results of the cavity filled simulation.

FIG. 16 illustrates a region of laterally enclosed resist in a filled cavity or cavities.

FIGS. 17a-17b illustrate a generalization of the simulation of thin-layer squeezing for varying layer thicknesses and lateral constraints (1-D case).

FIGS. 18a-18e includes examples of uses of the decomposed-kernel approach to simulate several one-dimensional geometries.

DETAILED DESCRIPTION

A description of example embodiments of the invention follows.

Certain aspects of the invention model the deflections of stamp and substrate that govern the amount of residual layer non-uniformity and distinguish between a stamp's bending and its local indentation, offering insights for the selection of stamp materials and for the engineering of multi-layered stamps.

Certain aspects of the invention provide layout 'design rules' that may assist device designers in minimizing residual layer thickness variation.

The set of techniques described herein forms a basis for a family of process-design and pattern-refinement software tools. In doing so, these modeling approaches may be the key to much broader industrial acceptance of hot micro-embossing and of nanoimprint lithography.

Figure 1:
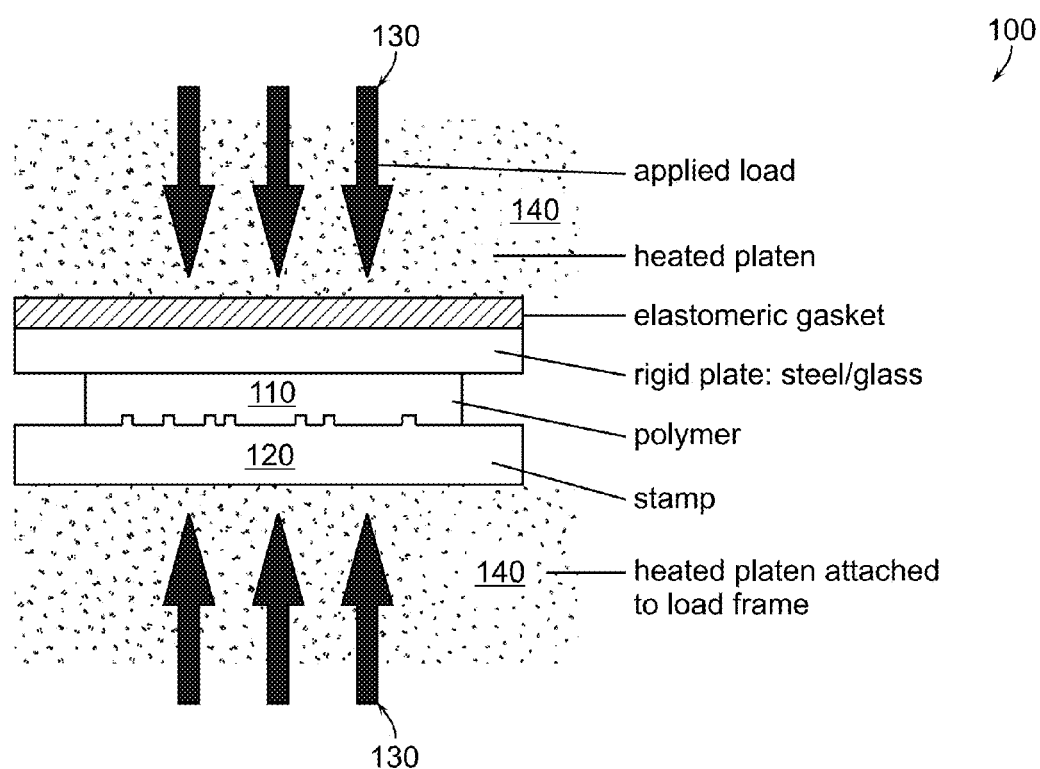
FIG. 1 illustrates an example of hot embossing of a deformable body.

FIG. 1 illustrates an example 100 of hot embossing of a deformable body such as a thermoplastic polymer 110. In hot embossing, a deformable body (e.g., polymer) 110 is heated until it softens, and a hard, reusable, patterned stamp 120 is then pressed into the polymer 110 before both the stamp 120 and the polymer 110 are cooled and then separated. The heating of the polymer 110 may be performed using a heated platen 140 or using any other available technique in the art. The deformable body 110 may be heated above its glass-transition temperature and an embossing load 130 may be applied in order to transfer a microstructure from the stamp 120 to the softened polymer 110. An elastometric gasket 150 may be employed on the flat side of the polymer 110 to ensure that the applied load is distributed adequately and uniformly across the flat side of the polymer even if the heated platens are not perfectly parallel. The polymer 110 may then be cooled to below its glass-transition temperature and the load 130 may be removed and separated from the stamp 120.

The polymer 110 may alternatively be patterned on both sides by inserting a second patterned stamp between the polymer 110 and the rigid plate. Alternatively, the rigid plate could be replaced by a second patterned stamp. Any such second stamp may carry the same pattern as stamp 120, or alternatively a different pattern.

Hot embossing combines moderate cost with ease of automation and may help bridge the gap between the invention and the commercialization of a number of micro and nano-fluidic devices and other micro- and nano-devices. Substrates processed by hot embossing may range in size from a single chip to a continuous roll of material (3-5). These features may make hot embossing both amenable to prototyping and potentially more cost-efficient than techniques such as injection molding for very high-volume manufacturing.

Hot embossing for the fabrication of microelectromechanical systems (MEMS) or microfluidics is usually performed on homogeneous polymeric sheets that are much thicker than the characteristic feature sizes of the patterns being embossed. These embossed layers constitute the body of the device being manufactured.

FIG. 2 is a plot that illustrates a relationship between time 205, temperature 210, loading duration 230, and applied load 240 in hot embossing of thermoplastic polymers, according to an example embodiment of the present invention. A pattern to be hot embossed may contain thousands of features ranging from less than a micron to several millimeters in diameter. An embossing temperature 210, load 220, and loading duration 230 must be selected such that every cavity on the stamp is filled with polymer as required. Other constraints on the maximum load 240 and temperature 210 may also be applied. For example, factors such as design of the embossing apparatus or an embosser, desire to restrict differential thermal contraction of stamp and substrate (6-7), or possibility of substrate degradation at very high temperatures may be included as limiting factors on the maximum load and temperature.

The loading duration 230 may be constrained by a desire to maximize throughput. One example embodiment of the present invention may obtain the processing parameters for modeling the displacement caused by embossing (i.e., temperature 210, loading duration 230, and applied load 240) by modeling the mechanical properties of the polymer and conducting a numerical simulation of the embossing process (assuming a set of candidate parameters).

FIG. 3a is an illustration 300 of representation of global compression of finite-thickness substrates before loading. FIG. 3b is an illustration 301 of representation of global compression of finite-thickness substrates under uniform applied pressure in the z direction.

Given that layer deflections and the characteristic dimensions of the features being embossed are much smaller than the true thickness of the substrate 110, it is reasonable to assume that the shape of the topography arising from spatial variation of the applied contact pressure will be substantially insensitive to the actual layer thickness. At the bottom of such a layer, the stress is almost indistinguishable from the stress that arises if a uniform contact pressure is applied at the top of the substrate. The amount of global compression of the substrate depends strongly on the original layer thickness and the average applied contact pressure. This global compression can be captured in the calculated value of $\Delta$ by adding a constant term to every element of the filter $g[m, n]$ or $g[m]$.

Assuming that the substrate 110 is either infinite in extent and experiences a periodic pressure distribution or laterally clamped at its edges, the global compression of the substrate may be represented as shown in FIGS. 3A and 3B. Specifically, the applied embossing pressure may be modeled as a uniform contact pressure distribution of magnitude $p_{s,0}$, the infinite extent of the substrate in x and y directions or, equivalently, clamped substrate edges are reflected by the imposition of zero strain in the x and y directions. Therefore, defining strains as positive-compressive:

$$E\varepsilon_{zz} = p_{s,0} - v(p_{xx} + p_{yy}) \qquad (1)$$
$$E\varepsilon_{xx} = 0 = p_{xx} - v(p_{yy} + p_{s,0})$$
$$E\varepsilon_{yy} = 0 = p_{yy} - v(p_{xx} + p_{s,0})$$

-continued
$$\varepsilon_{zz} = \frac{p_{s,0}}{E}\left(1 - \frac{2v^2(1+v)}{1-v^2}\right)$$

where the polymer network of the material deforms over time and approaches a limiting configuration determined by the network's elastic modulus denoted by E.

The convolution of a uniform contact pressure distribution of magnitude $p_{s,0}$ with the filter $g[m, n]$ implies the following displacement, $\Delta$, of the substrate surface:

$$\Delta = p_{s,0} \sum_{n=0}^{N-1} \sum_{m=0}^{M-1} g[m, n] \qquad (2)$$

and $\Delta$ is proportional to the initial substrate thickness, $h_s$:

$$\Delta = \varepsilon_{zz} h_s \qquad (3)$$

such that:

$$\sum_{n=0}^{N-1} \sum_{m=0}^{M-1} g[m, n] = \frac{h_s}{E}\left(1 - \frac{2v^2(1+v)}{1-v^2}\right). \qquad (4)$$

The global compression behavior of the layer may therefore be approximated by adding a constant value to every element of $g[m, n]$ so that it satisfies equation (4) above. The same approach works in the plane-strain case. The shape of the simulated topography is not affected by this constant term in the filter and the only effect is a change in the rigid-body stamp displacement $\Delta$.

Accounting for Material Anisotropy

There are cases in which an embossed polymeric sheet is strongly anisotropic. Thermoplastic sheets or plates are variously prepared by casting, extrusion, and injection molding. In the cases of extrusion and injection molding, polymer chains can become aligned in a particular direction, and strongly directional residual stresses can be introduced by the process. Therefore, one aspect of the present invention captures possible material anisotropy by making the point-load response of the material anisotropic. A new dimensionless parameter, $k_a$, is introduced to represent the strength of the anisotropy.

Figures 4A, 4B, 4C:
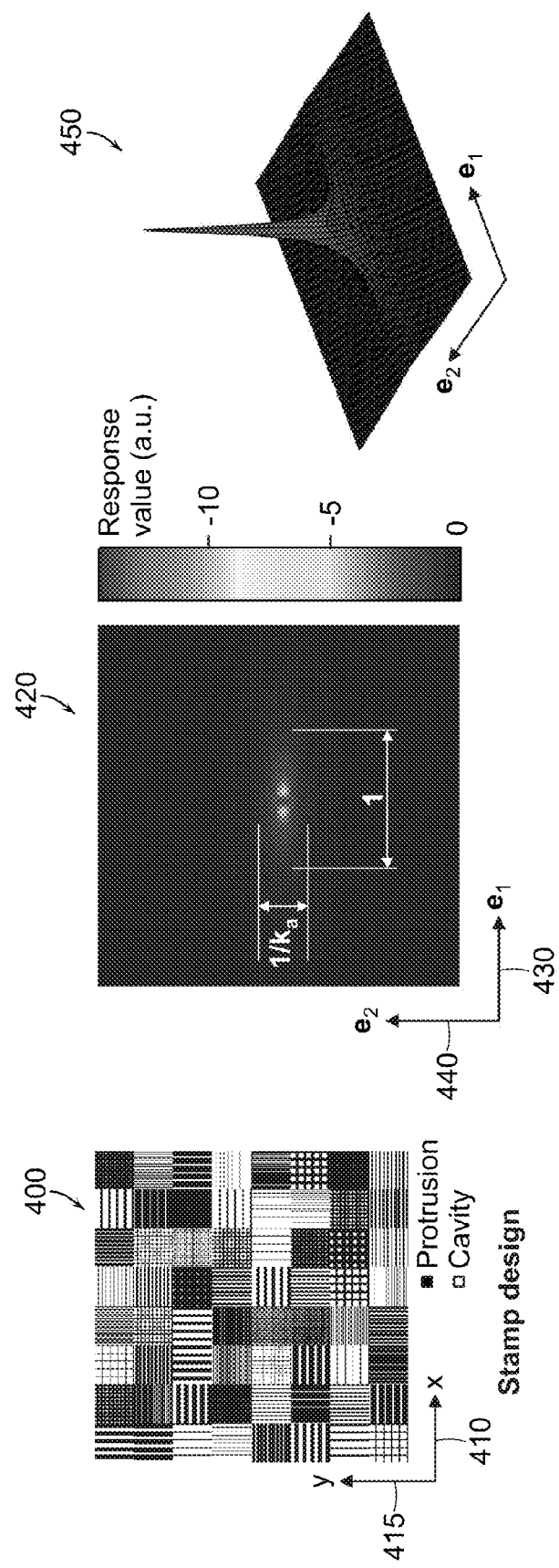
FIGS. 4a, 4b, and 4c illustrate an anisotropic point-load and its relation to geometry of an embossed pattern.
Figure 5A:
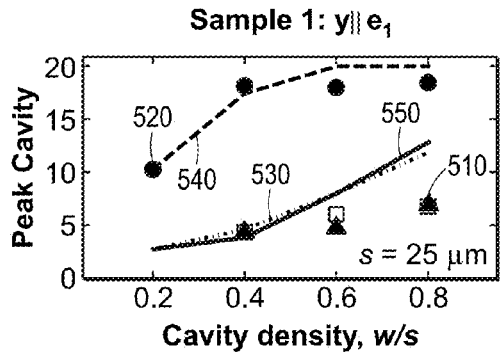
FIGS. 5a-5f are plots that illustrate measured peak cavity penetration heights patterns of two samples embossed using aspects of the present invention.
Figure 5D:
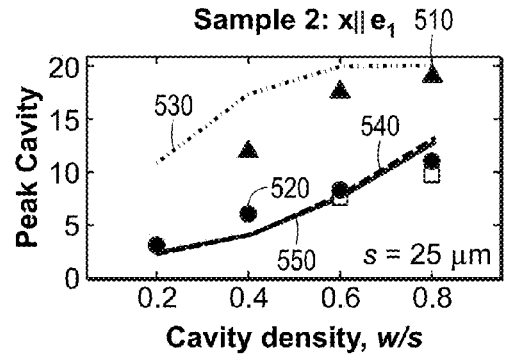
Figure 5B:
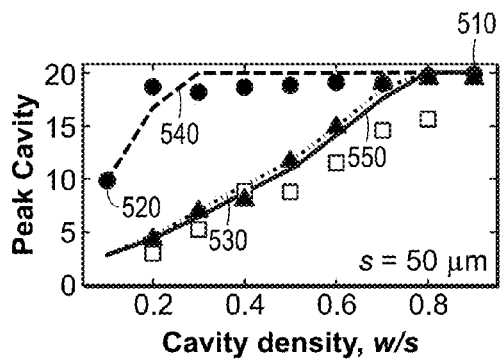
Figure 5E:
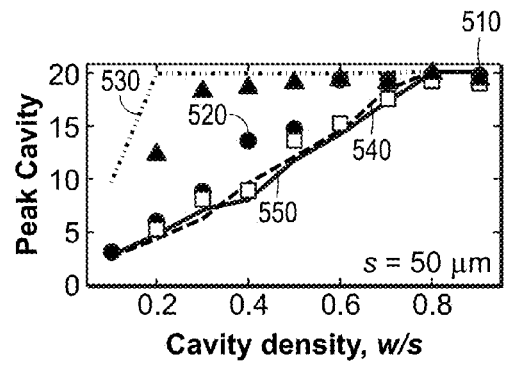
Figure 5C:
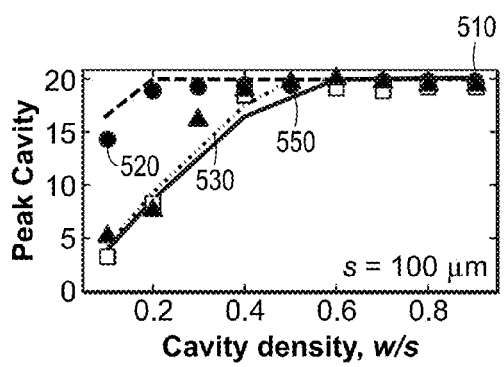
Figure 5F:
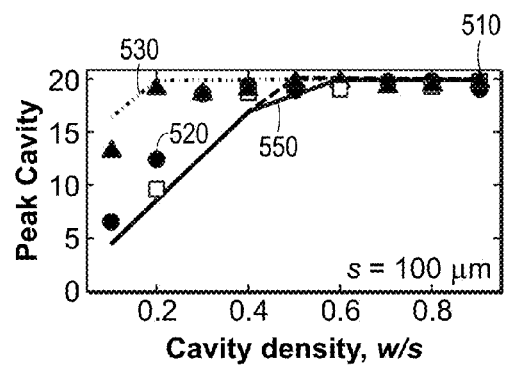

FIGS. 4a-4c illustrate effects of the anisotropy parameter anisotropic point-load response and its relation to the geometry of the embossed pattern. FIG. 4a demonstrates a stamp design 400 defined in x 410 and y 415 co-ordinates. FIG. 4b illustrates the anisotropic point-load response 420. The anisotropic point-load response 420 is a property of the material being embossed and is shown with reference co-ordinates $e_1$ 430 and $e_2$ 440. FIG. 4c illustrates a 3-D rendering 450 of a typical anisotropic point-load response. Specifically, the coordinate system of the material may be defined using the vectors $(e_1, e_2)$ 430, 440 and that of the stamp using (x, y) 410, 420. The lateral extent of the point-load response 420 is shrunk by a factor of $1/k_a$ 450 in the material's $e_2$ 430 direction, relative to an isotropic material.

The anisotropic point load response may be spatially compressed by a factor $1/k_a$ in the $e_2$ direction, relative to the isotropic function. This compression captures the fact that an anisotropic material may penetrate cavities oriented in a particular direction more easily than those oriented in other directions. When a long and narrow cavity is oriented parallel to the more elongated axis of the point load-response function, the cavity will fill more deeply for a given applied pressure than if the cavity were oriented perpendicular to the more elongated axis. The test pattern in FIG. 4a includes cavities oriented in two perpendicular directions, and so may be used to identify experimentally the appropriate orientation of the anisotropic point-load response. If the direction of anisotropy are at 45 degrees to the two trench directions, it may, however, be impossible to use this pattern to determine the appropriate orientation of the point load-response function. Therefore, a test pattern with trenches aligned in three separate directions may be used to allow for a more reliable identification of the direction of any anisotropy.

The direction of orientation of polymer chains in the embossed material may correspond to the direction of the more elongated axis of the anisotropic point load response.

The material's anisotropy may be related to the coordinate system of the stamp 410, 420 by redefining the point-load response 420 of the simulation's virtual elastic layer using:

$$g[m, n] = -\frac{1-v^2}{\pi E}[f(x_2, y_2) - f(x_1, y_2) - f(x_2, y_1) + f(x_1, y_1)] \quad (5)$$

where $$f(x, y) = y\ln(x + \sqrt{x^2 + y^2}) + x\ln(y + \sqrt{x^2 + y^2})$$

and $$x_1 = md - \frac{d}{2}; x_2 = md + \frac{d}{2}; y_1 = k_a\left(nd - \frac{d}{2}\right);$$

$$y_2 = k_a\left(nd + \frac{d}{2}\right) \text{for } x\|e_1;$$

$$x_1 = k_a\left(md - \frac{d}{2}\right); x_2 = k_a\left(md + \frac{d}{2}\right);$$

$$y_1 = nd - \frac{d}{2}; y_2 = nd + \frac{d}{2} \text{for } y\|e_1;$$

Tuning the Modified Model to Represent Anisotropy in a Sample of Topas 5013S

FIGS. 5a-5f are plots that illustrate measured peak cavity penetration heights of the two samples' patterns embossed using aspects of the present invention.

Sample 1 (FIGS. 5a-5c) is generated using an injection-molded, 1 mm-thick plate of the cyclic olefin polymer Topas 5013S that was obtained as a gift from Topas Advanced Polymers (Florence, Ky.). This plate was cut into 25 mm-square pieces, and the orientation of each piece was noted relative to the framework of the supplied plate. One of the pieces was embossed with a silicon stamp carrying the test-pattern of our earlier experiments. The relief of the test-pattern was 20 μm, and the x and y axes of the pattern were aligned to be parallel to the edges of the polymer piece. The embossing conditions were 95° C., 800 kPa, and 4 minutes' loading duration. The material was cooled to 60° C. before unloading.

Sample 2 (FIGS. 5d-5f) is generated using a second square piece of the Topas 5013 material that was embossed under the same conditions, but with the orientation of the polymer piece relative to the stamp pattern differing by 90° from the previous experiment.

In both samples (samples 1 and 2), a strong orientation dependence of the depth of penetration of the long, slender rectangular cavities is observed. In Sample 1, the rectangular cavities 510 whose long axis runs parallel to the x-axis of the stamp have filled much less deeply than the cavities 520 running parallel to the y-axis. In Sample 2, this trend is reversed, with the cavities running parallel to the stamp's x-axis penetrating more deeply. This strong change in behavior indicates that the principal axes of the material's anisotropy run approximately parallel with the edges of the polymer squares embossed.

The anisotropy of this sample of Topas 5013S, without calibrating a full viscoelastic material model may be modeled by fitting a value for $k_a$, and a value for the effective compliance of the material given the four-minute, 95° C. processing conditions used. A reasonably close approximation to experimental results may be obtained by taking a value of 4 for $k_a$ and a value of 1.6 MPa for the effective stiffness, E, of the polymeric substrate, as defined in equation (5). Poisson's ratio, v, is assumed to be 0.5. The output of a simulation assuming these parameters is shown by the plotted lines 530, 540, 550 in FIG. 5a-5f.

By modeling material anisotropy, embodiments of the present invention are able to detect the material's anisotropy. Certain embodiments may enable a test pattern to detect anisotropy by including slender rectangular cavities having three or more orientations.

The extent of material anisotropy of any given polymer plate is a strong function of its processing history. The anisotropy of one particular batch of a particular material is therefore not necessarily representative of any other batch of the same material. Accordingly, embossing tests may be needed to identify batch-to-batch variation of material anisotropy.

Although the approach developed above assumes a Voigt material model to represent the micro-embossing behavior of the relatively high molecular-weight polymers, alternative representations of the polymer may be used.

Generalizing Compliance Functions

Aspects of the present invention may be adapted to use any linear function of time to represent "compliance" of the polymer. The term compliance refers to a characteristic parameter that relates to the mean value of the peak penetration depths $z_{pk}$ across all regions of the test pattern, divided by the average applied embossing pressure $p_0$.

If the compliance is denoted by J(t), the expression for the response of the surface of a half-space to a point load applied for all time t>0 becomes:

$$s_{general}(x, y, t) = \frac{-(1-v^2)J(t)}{\pi\sqrt{x^2+y^2}} \quad (6)$$

and the corresponding impulse response becomes:

$$g_{general}(x, y, t) = \frac{-(1-v^2)\frac{dJ(t)}{dt}}{\pi\sqrt{x^2+y^2}}. \quad (7)$$

The convolution integral describing the embossed topography becomes:

$$w(x, y, t) = \quad (8)$$

$$\frac{-(1-v^2)}{\pi}\int_0^t\int_{-\infty}^{\infty}\int_{-\infty}^{\infty}\frac{p(x', y', t')\frac{dJ(t-t')}{dt'}}{\sqrt{(x-x')^2+(y-y')^2}}dx'\,dy'\,dt'$$

and weighted time-average of applied pressure is:

$$p_g(x, y, t_h) = (1 - v^2) \int_0^{t_h} p(x, y, t') \frac{dJ(t-t')}{dt'} dt'. \quad (9)$$

Averaging spatially over one period of the embossed pattern:

$$p_{g,0}(t_h) = (1 - v^2) \int_0^{t_h} \frac{1}{D^2} \int_0^D \int_0^D p(x, y, t') dx dy \frac{dJ(t-t')}{dt'} dt' = \quad (10)$$

$$(1 - v^2) \int_0^{t_h} p_0(t') \frac{dJ(t-t')}{dt'} dt'.$$

From this, equation (8) may be rewritten as:

$$w(x, y, t_h) = \frac{-1}{\pi} \int_{-\infty}^{\infty} \int_{-\infty}^{\infty} \frac{p_g(x, y, t_h)}{\sqrt{(x-x')^2 + (y-y')^2}} dx' dy'. \quad (11)$$

Expression (11) is equivalent to instantaneously embossing an elastic substrate with $E/(1-v^2)=1$, with the dimensionless pressure distribution $p_g(x, y, t_h)$. From expression (10), the spatial average of $p_g(x, y, t_h)$ as a function of the spatial average of true applied pressure over time is known. Therefore, $w(x, y, t_h)$ may be found using the spatial average.

FIG. 6 is a table that includes an outline of some possible polymer models and their corresponding compliance functions J(t). Specifically, purely elastic 610, Newtonian liquid 620, Maxwell model 630, Kelvin-Voigt Model 640, and hybrid Maxwell model with Voigt Model 650, possible uses of each polymer, their corresponding compliance functions J(t), and their corresponding change over time are outlined.

Nanoimprint Lithography

Certain aspects of the present invention relate to modeling nanoimprint lithography. In nanoimprint lithography, cavity widths are often comparable to layer thicknesses. Nanoimprint lithography may be associated with several modeling challenges. For example, a layer of material being nanoimprinted is usually reduced to a small proportion of its initial thickness in certain regions of the pattern, and it will be essential to represent the increasing difficulty of reducing this residual layer's thickness as it becomes progressively thinner. Further, in nanoimprint lithography, the deflections of the stamp and the hard substrate underlying the imprinted layer are often of crucial importance. While the deflections of a half millimeter-thick silicon stamp when compared with the deflections of a softened millimeter-thick plate of PMMA are negligible, in nanoimprint lithography, these deflections become comparable in magnitude to the deformations of the polymeric resist layer, which might be only 100 nm thick.

Also, in nanoimprint lithography, in addition to ensuring that every cavity on a stamp is filled with resist material during a particular imprint process, it is often required to determine the thickness and uniformity of the residual layer of imprinted resist since this residual layer is often etched through in a post-imprint fabrication step and any variation in layer thickness imposes a need for over-etching (i.e., prolonging the duration of the etching step to ensure that even the thickest parts of the residual layer are penetrated). Residual layer thickness variation propagates to variation of the critical dimensions of the underlying etched features, and probably to unwanted device performance variation. Therefore, it is desirable to be able to control, or predict, residual layer thickness variation for a given imprinting pattern and process.

Various nanoimprint machine designs may be employed. For example, wafer-scale imprinting of spun-on thermoplastic or thermosetting layers, 'Step-and-flash' imprint (stepping with a die-sized stamp across the wafer and filling the cavities with freshly sprayed-on liquid resist before being cured with UV light), and Roll-to-roll nanoimprinting may be employed. Wafer-scale embossing of a spun-on visco-elastic layer is described herein. Wafer-scale embossing is a widely-used process and is deployed in commercially available imprint tools and in academic research. An additional, realistic, assumption that may be made is that the wafer is patterned with a square array of nominally identical dice, such that the pattern is approximated as being periodic in space. Further, the relationships between the time-course of applied pressure, visco-elastic layer parameters, and imprinted layer topographies are parameterized for three simple types of imprinted geometry: parallel lines, square holes, and circular pads. These relationships are integrated with a description of stamp and substrate deflections to construct a technique for simulating the imprinting of feature-rich patterns.

Modeling Stamp and Substrate Deflections

The imprinting system being modeled include polymer layers that sit on a substrate which is relatively hard and perfectly elastic, and which may be regarded as a half-space consisting of the wafer on to which the resist has been spun and the underlying platen (made, for example, of steel). Meanwhile, a patterned elastic stamp of finite thickness is pressed hydrostatically into the resist. The use of a hydrostatic pressure to press the stamp against the imprinted layer (the so-called 'air cushion' press design [4-5]) is intended to counteract wafer-scale non-uniformity by allowing the stamp to bend and conform to long-range non-flatness of the stamp or substrate.

To model the deflections of stamp and substrate within our framework, certain embodiments require that the expressions for the responses of the stamp and substrate surfaces to unit contact pressure to be applied uniformly across one d×d region.

Further, any compression of individual feature protrusions from the stamp may be ignored, since their heights are a tiny fraction of the stamp thickness, and they are in almost all cases much harder than the resist itself, individual stamp feature compression can usually be safely neglected.

Substrate Deflections

The deflections of the substrate may be modeled as:

$$g_{substrate}[m, n] = \frac{1 - v_{substrate}^2}{\pi E_{substrate}} \left[ \begin{array}{c} f(x_2, y_2) - f(x_1, y_2) - \\ f(x_2, y_1) + f(x_1, y_1) \end{array} \right] \quad (12)$$

where $$f(x, y) = y\ln(x + \sqrt{x^2 + y^2}) + x\ln(y + \sqrt{x^2 + y^2})$$

and $$x_1 = md - \frac{d}{2}; x_2 = md + \frac{d}{2}; y_1 = nd - \frac{d}{2}; y_2 = nd + \frac{d}{2}.$$

Appropriate values for $E_{substrate}$ and $v_{substrate}$ may be those of silicon: ~120 GPa and 0.27 respectively.

Stamp Deflections

The deflections of the stamp, meanwhile, may be regarded as having two components: an 'indentation' component, and a 'bending' component. The indentation component dominates cases where the characteristic spatial period of the contact pressure distribution is smaller than the thickness of the stamp. A good approximation for the kernel function describing the indentation component, $g_{stamp,indentation}[m, n]$, has the same form for substrate indentations. The values of E and v may be those of the stamp material; since stamps are often made from silicon, $g_{stamp,indentation}[m, n]$ and $g_{substrate}[m, n]$ will frequently be identical in magnitude.

The stamp's bending mode, in contrast, may be expected to dominate deflections, where the characteristic spatial period of the contact pressure distribution is larger than approximately the stamp thickness. While most patterns imprinted using NIL have lateral feature separations that are far smaller than the stamp thickness, there may be pattern density variations that occur over distances greater than a stamp thickness, so we do wish to allow for the possibility of stamp bending.

The stamp bending kernel may be derived by exploiting the assumption of spatial periodicity. The application of unit stamp-substrate contact pressure across a given d×d region of the stamp is balanced by a hydrostatic pressure of $d^2/D^2$ applied to the backside of the stamp, assuming that the spatial period of the stamp is D in each direction. Because of the assumption of spatial periodicity, the application of unit pressure in one d×d region of the simulated pattern is equivalent to the application of unit pressure at an infinite array of d×d regions, spaced D apart in both directions across an infinitely large stamp. Looking at one particular D×D period of this imagined infinite stamp, the stamp's deformed shape is identical to that of an edge-clamped square plate of size D×D, experiencing uniform pressure of $d^2/D^2$ on one side and unit pressure applied on the other side to a d×d region at its center. The deflections of this equivalent clamped plate can be found using the standard analytical results of Timoshenko [6] and Reddy [7]. The following two plate topographies may be superimposed: (i) $g_U(x, y)$, that resulting from the hydrostatic applied pressure of $d^2/D^2$, and (ii) $g_P(x, y)$, that resulting from the localized load at the center of the plate:

$$g_{stamp,bending}(x,y) = g_U(x,y) - g_P(x,y) \quad (13)$$

The localized load is modeled as a point load of magnitude $d^2$ to enable the ready use of standard formulae. Following the methods used by Timoshenko and Reddy, $g_U(x, y)$ and $g_P(x, y)$ are each given by the superposition of two sets of deflections: the deflections $g_{\{U/P\},s}(x, y)$ of a simply supported plate exposed to the loads just described, and the deflections $g_{\{U/P\},m}(x, y)$ in response to edge clamping moments that satisfy the condition of no edge rotations of the plate. The function $g_{\{U/P\},m}(x, y)$ describes the deflections resulting from clamping moments applied to only two opposite edges of the plate's four edges, whereas in fact clamping moments are experienced at all four edges so that the overall deflections $g_{\{U/P\}}(x, y)$ include both $g_{\{U/P\},m}(x, y)$ and its transpose, $g_{\{U/P\},m}(y, x)$.

$$g_U(x, y) = g_{U,s}(x, y) + g_{U,m}(x, y) + g_{U,m}(y, x) \\ g_P(x, y) = g_{P,s}(x, y) + g_{P,m}(x, y) + g_{P,m}(y, x) \quad (14)$$

Figures 7, 8:
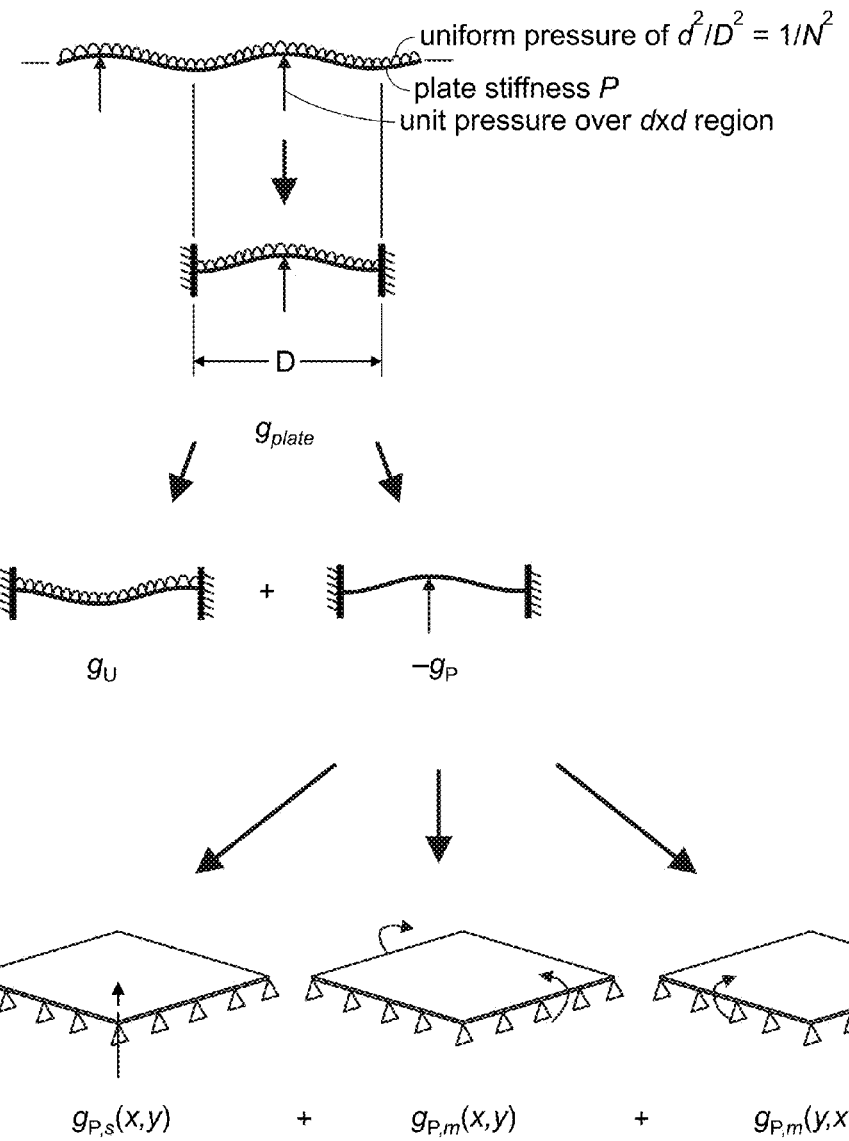
FIG. 7 illustrates Kernel functions used for describing stamp bending in certain aspects of the present invention.
FIG. 8 is a table that includes values required for construction of a plate bending function Kernel.

FIG. 7 illustrates Kernel functions used for describing stamp bending in certain aspects of the present invention. The discretized bending kernel for the stamp, $g_{stamp,bending}[m, n]$, is a discrete representation of $g_{plate}(x, y)$ that is obtained by sampling $g_{plate}(x, y)$ sampled at spatial intervals of d.

Expressions for $g_{\{U/P\},m}(x, y)$ and $g_{\{U/P\},s}(x, y)$ are given below:

$$w_{U,s}(x, y) = \frac{4D^4}{N^2 \pi^5 P} \sum_{m=1,3,5,7} \frac{(-1)^{\frac{m-1}{2}}}{m^5} \cos\left(\frac{m\pi x}{D}\right)\left[1 - \frac{\alpha_m \tanh \alpha_m + 2}{2\cosh \alpha_m}\cosh\left(\frac{m\pi y}{D}\right) + \frac{m\pi}{2D\cosh \alpha_m} y \sinh\frac{m\pi y}{D}\right] \quad (15)$$

$$w_{U,m}(x, y) = -\frac{2D^4}{N^2 \pi^5 P} \sum_{m=1,3,5,7} \frac{Q_m(-1)^{\frac{m-1}{2}}}{m^2 \cosh \alpha_m} \cos\left(\frac{m\pi x}{D}\right)\left[\frac{m\pi}{D} y \sinh\left(\frac{m\pi y}{D}\right) - \alpha_m \tanh \alpha_m \cosh\left(\frac{m\pi y}{D}\right)\right] \quad (16)$$

$$w_{P,s}(x, y) = \frac{4d^2}{D^2 P} \sum_{n=1}^{7} \sum_{m=1}^{7} \frac{1}{k_{mn}} \sin\left(\frac{m\pi}{2}\right)\sin\left(\frac{n\pi}{2}\right) \sin\left(\frac{m\pi\left(x - \frac{D}{2}\right)}{D}\right)\sin\left(\frac{n\pi\left(y - \frac{D}{2}\right)}{D}\right) \quad (17)$$

$$k_{mn} = \left(\frac{\pi}{D}\right)^4 (m^4 + 2m^2 n^2 + n^4) \quad (18)$$

$$w_{P,m}(x, y) = -\frac{D^2 d^2}{2\pi^2 P} \sum_{m=1,3,5,7} \frac{R_m(-1)^{\frac{m-1}{2}}}{m^2 \cosh \alpha_m} \cos\left(\frac{m\pi x}{D}\right)\left[\frac{m\pi}{D} y \sinh\left(\frac{m\pi y}{D}\right) - \alpha_m \tanh \alpha_m \cosh\left(\frac{m\pi y}{D}\right)\right] \quad (19)$$

$$\alpha_m = \frac{m\pi}{2} \quad (20)$$

$$P = \frac{E t_{plate}^3}{12(1 - v^2)} \quad (21)$$

In equations (15) and (16), N=D/d. The values of $Q_m$ and $R_m$ referred to in (16) and (19) respectively are given by Timoshenko. FIG. 8 is a table that includes values of $Q_m$ and $R_m$ required for construction of the plate bending function Kernel. As shown in FIG. 8, the introduction of the m=7 terms makes no appreciable difference to the shapes of the final kernels, compared to the case of using all lower terms but not m=7 itself. It is therefore concluded unnecessary to add terms above m=7.

The plate-bending expressions derived are for a uniform-thickness, isotropic plate. However, other expressions may be derived for layered or composite plates in a similar manner. Further, the expressions for the kernel functions may be generalized to deal with anisotropic materials in a similar manner.

Quantifying the Relative Magnitudes of Stamp Indentation and Bending

Stamp indentation may dominate deflections when the characteristic spatial period of the imprinted pattern is lower than approximately a stamp thickness. Further, bending may dominate for larger spatial periods. Certain aspects of the present invention quantify the relative importance of these two modes through simulations that use the kernel functions derived above.

Hard surfaces of topography z(x, y) are defined as follows, and discretized:

$$z(x, y) = z_0 \sin\left(2\pi \frac{x}{\lambda}\right)\sin\left(2\pi \frac{y}{\lambda}\right). \quad (22)$$

Here, λ represents the characteristic spatial period of the topography. The simulations may be performed such that an initially flat layer of material having the elastic properties of the stamp is forced to conform to this hard topography. Firstly, only the indentation mode of the stamp is considered. For each of a range of values of λ, the contact pressure distribution required to pull the stamp fully into contact with the surface z(x, y) may be determined. The pressure distributions are found by de-convolving the discretized z[m, n] with or $g_{stamp,indentation}[m, n]$. Arbitrary values may be used for $z_0$ and for the stamp's plate modulus, $E'$. For each calculation, the amplitude of the pressure distribution, $p_{z0,i}$, is recorded.

The procedure may be further repeated by considering only the bending mode of the stamp. The pressure distributions may be found by de-convolving the discretized $z[m, n]$ with $g_{stamp,bending}[m, n]$. An arbitrary value may be adopted for the stamp thickness, $t_{stamp}$. For each calculation the amplitude of the pressure distribution, $p_{z0,b}$, is recorded.

It is noted that $p_{z0,i}$ is inversely proportional to the wavelength of the surface, while $p_{z0,b}$ is inversely proportional to the fourth power of the wavelength. The constants $k_i$ and $k_b$ are then defined as follows:

$$p_{z0,i} = \frac{k_i z_0 E'}{\lambda}; \tag{23}$$

$$p_{z0,b} = \frac{k_b z_0 E' t_{stamp}^3}{\lambda^4}; \tag{24}$$

$$E' = \frac{E}{1-\nu^2}. \tag{25}$$

The values of these constants may be extracted from the numerical simulation. For example, $k_i$ may be found to be 4.28 and $k_b$ to be 336 (3 s.f.). By defining the value of $\lambda$ at which $p_{z0,b} = p_{z0,i}$ to be that at which bending and indentation are of equal importance, stamp bending may be found to begin to play a larger role than bulk indentation in conforming to the surface when $$\frac{\lambda}{t_{stamp}} > \sqrt[3]{\frac{k_b}{k_i}} \approx 4. \tag{26}$$

Since stamp compliance is what enables residual layer non-uniformity to arise, it may seem desirable, from the perspective of minimizing pattern dependencies, to make stamps as stiff as possible. One good reason for not wishing to make a stamp infinitely stiff, however, is that stamps, substrates, and polymeric layers may not be perfectly flat at the start of the imprinting process. For example, they may be wavy, or bowed, or have a certain roughness, or have dust particles sitting on their surface. A stamp with a certain amount of compliance may conform to these imperfections and reduce the lateral extent of their influence; that indeed is the purpose of the air cushion press design.

As a proxy for the ability of a stamp to conform to layer topography imperfections, certain embodiments may use the level of contact pressure uniformity that arises when an elastic layer having the properties of the stamp is pressed against a hard topography representing the uneven layer. Suppose that a specification is placed on the pressure non-uniformity arising from layer waviness of a certain wavelength, such that it must not exceed a fraction $\alpha$ of the average contact pressure $p_0$.

Figure 9:
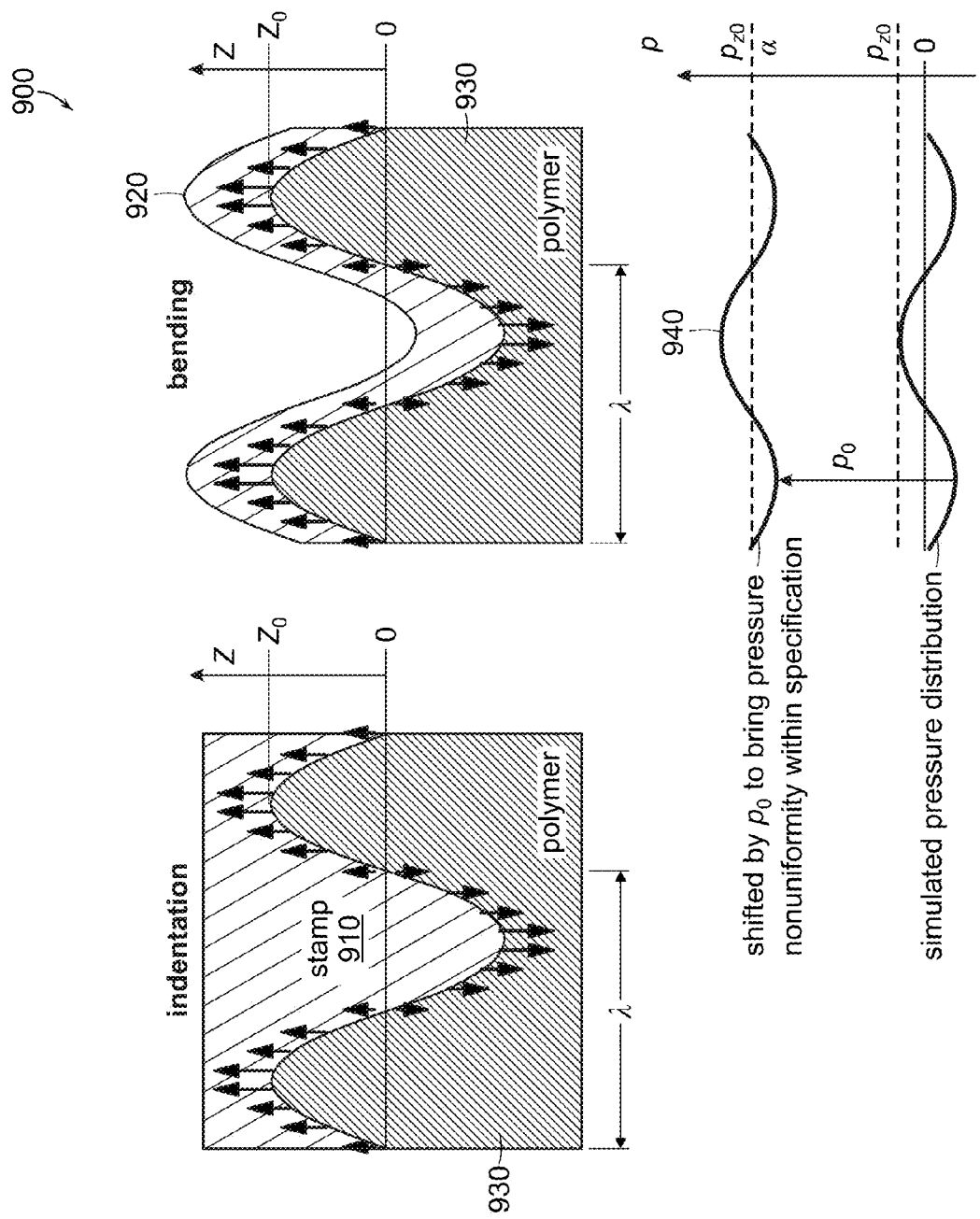
FIG. 9 is an illustration of contact pressure non-uniformity for a hard rough surface and a stamp that can either bend or be indented.

FIG. 9 is an illustration 900 of contact pressure non-uniformity for a hard rough surface and a stamp that can either bend 920 or be indented 910. For an incompressible layer material 930, the total contact pressure distribution is equal to the zero-mean pressure distribution required to just bring the elastic layer into contact with all points of the topography, plus a constant $p_0$.

Therefore, at the wavelength (shown as plot 940) at which stamp bending becomes more significant than indentation, the largest allowable roughness amplitude $z_0$ that will keep the pressure within its non-uniformity specification may be given by:

$$\frac{z_0}{t_{stamp}} = \sqrt[3]{\frac{k_b}{k_i}}\left(\frac{\alpha P_0}{E' k_i}\right). \tag{27}$$

Figure 10:
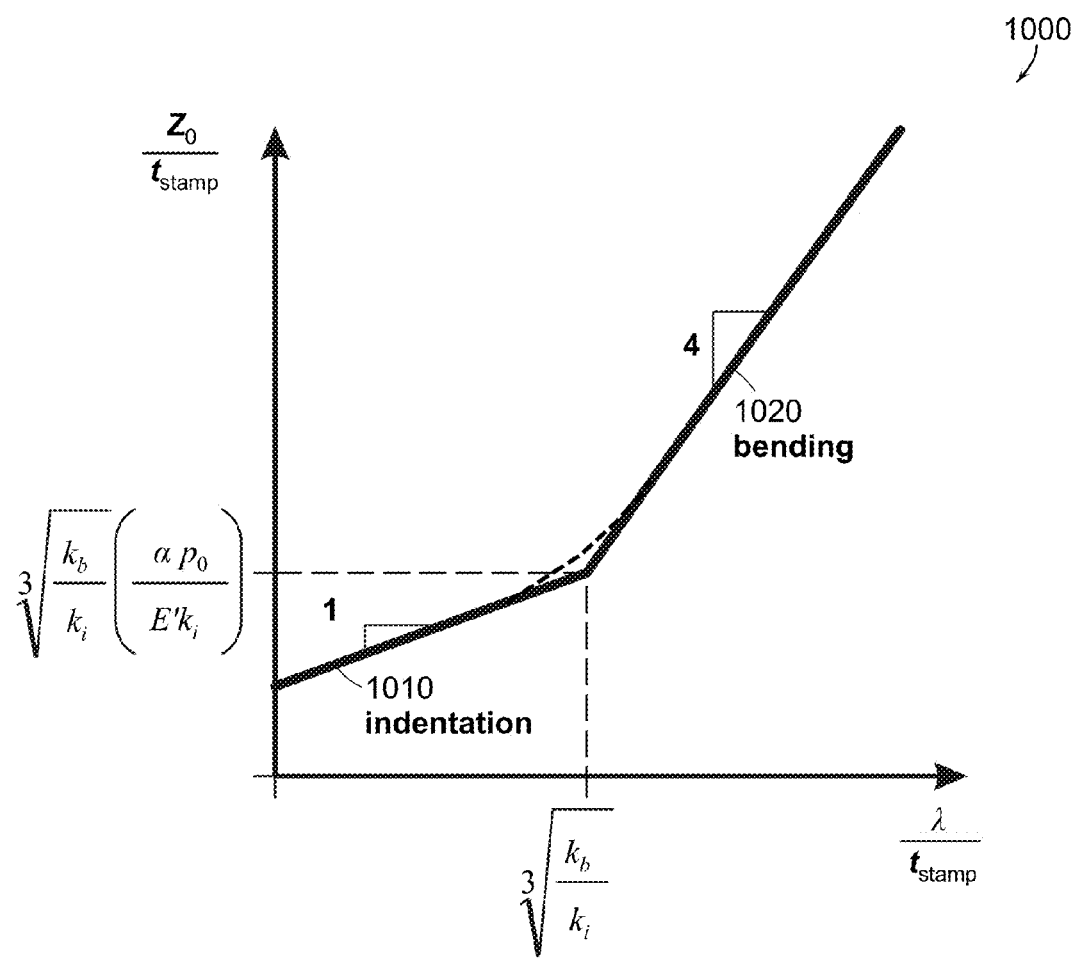
FIG. 10 is a schematic graph of the maximum surface waviness to which a stamp can conform.

FIG. 10 is a schematic graph 1000, on logarithmic axes, of the maximum surface waviness to which a stamp can conform as a function of the applied average pressure, the pressure non-uniformity specification, the material properties, and the characteristic wavelength of surface roughness. As shown in FIG. 10, the maximum allowable surface waviness amplitude may be plotted against the characteristic wavelength of the layer imperfections. Near the transition region, both indentation 1010 and bending 1020 are in fact relevant, and the dashed line in FIG. 10 suggests how the maximum acceptable $z_0$ might, in reality, change with $\lambda$.

Modeling the Use of Layered Stamps

Given the dual aims, when designing a stamp, of minimizing pattern-dependent residual layer non-uniformity and accommodating any initial layer imperfections, one may imagine that it would be useful to tailor the wavelength, compliance spectrum of the stamp, i.e., the shape of the curve illustrated in FIG. 10. For example, stamps composed of two of more layers of varying stiffness, or stamps with graded, depth-varying stiffness, may provide better performance than a single, thick elastic layer.

If, for example, polymer layers of a certain type are known to exhibit bow or waviness but very little roughness below a particular characteristic wavelength, it may be valuable to produce a stamp in which the features were patterned on a relatively stiff surface layer attached to a more compliant support layer. This way, initial layer waviness may be accommodated while residual layer non-uniformity is suppressed at length scales smaller than that of the waviness. Such an approach has been demonstrated by Suh et al. [8].

Conversely, if the layer being imprinted is particularly rough at small length-scales, it may be beneficial to make the stamp with a soft surface layer on a harder support material. McClelland et al. report the use of this approach for the patterning of resist spun on to rough magnetic layers [9].

Certain embodiments tailor the compliance of the stamp so that the shape of its wavelength—compliance ($z_0$-$\lambda$) spectrum hugs as closely as possible the characteristic spectrum of any parasitic roughness/waviness of the stamp and substrate. This way, the stamp does not deform any more than is needed to counteract these parasitic topographies, and so pattern-dependent residual layer variation is no larger than it needs to be. In fact, there is likely to be a trade-off between accommodating any parasitic roughness/waviness of the stamp and substrate and limiting pattern-dependent stamp deflections.

Figure 11:
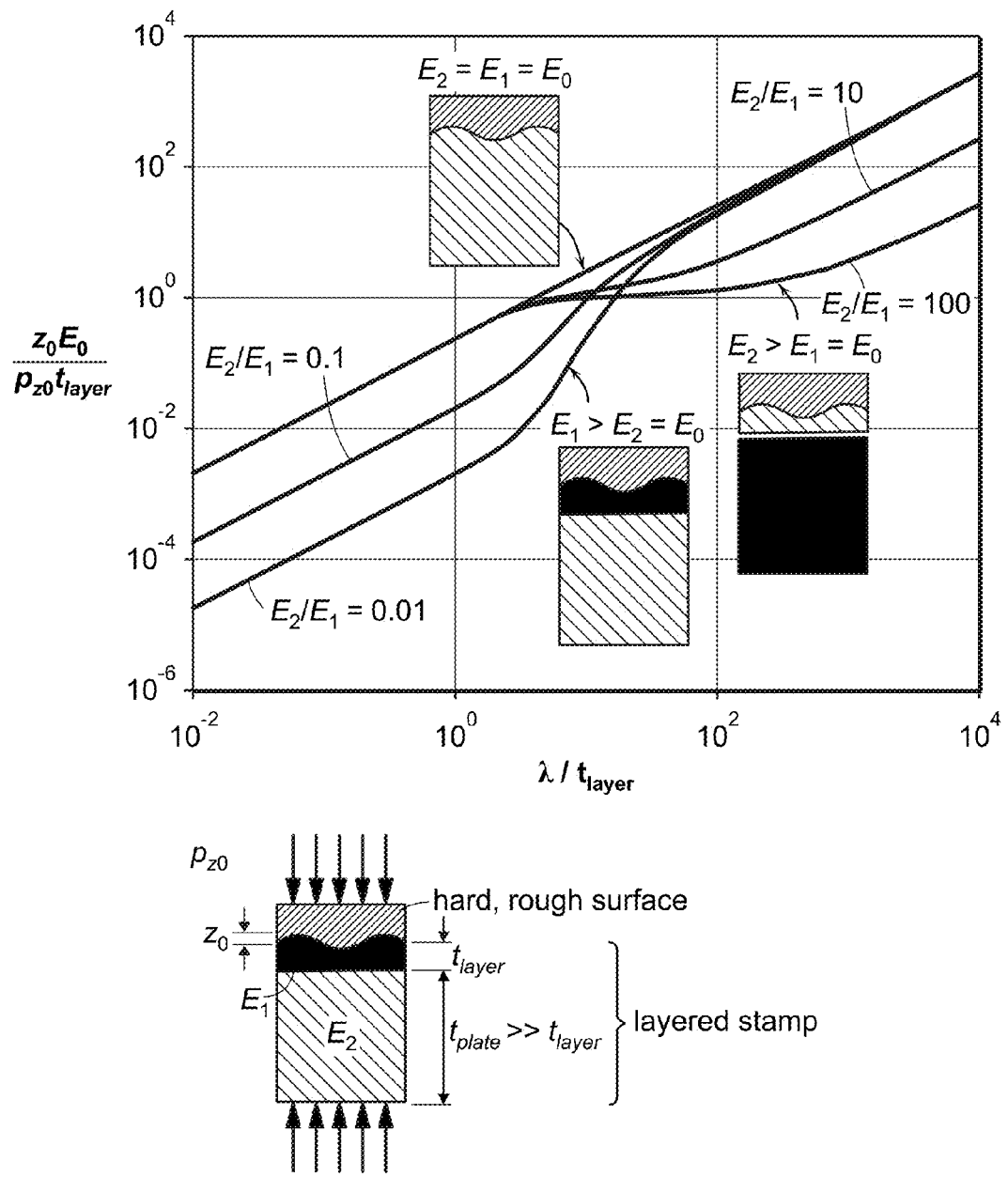
FIG. 11 is a plot that illustrates the ability of a two-layer stamp to conform to surface roughness.

Certain embodiments of the invention employ a two-layer stamp modeling as a way of tailoring stamp compliance. FIG. 11 illustrates the factors determining the wavelength—compliance spectrum of a stamp with a coating layer of thickness $t_{layer}$ and elasticity $E_1$ attached to a thick backing layer of stiffness $E_2$. The kernel function described by Nogi and Kato [2] for the point load response of a layered elastic substrate are used in the numerical simulations that yielded these results. Where $E_1 < E_2$, stamp compliance is large for $\lambda << t_{layer}$, exhibits a plateau around $\lambda = t_{layer}$, and begins increasing again for $\lambda >> t_{layer}$, corresponding to substantial indentation of the backing layer. Where $E_1 > E_2$, the thin layer exhibits indentation behavior for $\lambda << t_{layer}$, behaves as a plate on an elastic support for $\lambda = t_{layer}$, and transmits loads fairly directly to the soft support layer for $\lambda \gg t_{layer}$.

By tuning the thickness of the coating layer and the elasticity of both layers, it may therefore be possible to 'hug' the parasitic roughness/waviness spectrum of a stamp and substrate more closely than can be done with a single-layer substrate. Multi-layer or graded-stiffness substrates could offer even better tailoring than two-layer stamps, although the analysis would be substantially more complicated and is left for the future.

Certain embodiments may tailor stamp compliance in other ways. For example, backside grooves may be introduced into nanoimprint stamps, usually aligned with the edges of dice [10-12]. These grooves increase the bending compliance of the stamp at length scales greater than that of the die size, and are claimed to enhance wafer-scale imprint uniformity. In step-and-flash imprint lithography, meanwhile, because the stamp is the size of a single die, it is possible to reduce wafer-scale non-uniformity by using mechanical systems that maneuver the stamp to be parallel to the local surface of the wafer before each imprint is made [13].

If it is inconvenient to tailor the stamp compliance, it may be possible to improve conformality of stamp and substrate by placing a compliant layer beneath the substrate itself. This approach is applicable for counteracting stamp or substrate waviness at length scales larger than the substrate thickness.

Hierarchical Approach

Certain embodiments bring together the models for polymer layer deformation and stamp/substrate deflections to construct a die-scale, hierarchical simulation method. As described above, each (identical) D×D die on the stamp may be discretized into regions of size d×d. The die design is described by a 'coarse' topography $w_{stamp}[m, n]$ that takes a uniform value within any given d×d region, upon which is superimposed a 'fine' topography characterized within each d×d region by a homogeneous, regular pattern of a particular pitch, shape, and areal density. In this way, a single simulation approach may be used both for large, feature-rich patterns and for intricate custom patterns discretized at the sub-feature scale.

Since the model considers a large square array of identical dice, any wafer-scale components of stamp and layer deformation may be ignored. Assuming that wafer-scale variation only becomes significant when all cavities within the die have been substantially filled, the following kinematic relationship between the reference displacement of the stamp, $\Delta$, and the deflections of stamp, substrate and polymer layer inside the stamp—layer contact region C may be developed:

$$w_{stamp}[m,n] + w_{D,die}[m,n] + w_{D,substrate}[m,n] + w_{local}[m,n] + w_{die}[m,n] = \Delta \, \forall m,n \in C \quad (28)$$

The reference displacement of the stamp, $\Delta$, is defined positive-downwards into the polymeric layer. The coarse stamp topography $w_{stamp}[m, n]$ is fixed for a given stamp and is defined positive upwards from the surface of the stamp that is in contact with the polymeric layer at the start of imprinting. Intra-die deflections of the surface of the stamp, $w_{D,die}$, are defined positive-upwards. Deflections of the substrate, $w_{D,substrate}$, are defined positive-downwards. Both $w_{D,die}$ and $w_{D,substrate}$ are assumed here to be periodic at the die level and to have no wafer-scale variation. Because the substrate is assumed elastic, substrate deflections consistent with the final imprinting pressure distribution spring back when the stamp is removed.

Deformations of the polymeric layer are defined such that the residual layer thickness $r[m, n]$—i.e. the thickness of the thinnest part of material within that region is given by the following relation:

$$r[m,n] = r_0 - w_{local,u}[m,n] - w_{die,u}[m,n] \quad (29)$$

where $r_0$ is the initial layer thickness. The quantity $w_{local}[m, n]$ represents the reduction of residual thickness that is associated with the filling of any fine features within the region [m, n]. Meanwhile, $w_{die}[m, n]$ represents any reduction of layer thickness that is consistent with the exchange of layer material between adjacent d×d regions. The quantity $w_{die}[m, n]$ is therefore responsible for capturing intra-die pattern interactions. The objective is to find the values of three particular quantities at the end of the imprinting cycle: (i) the residual layer thickness everywhere in the contact region, C; (ii) the proportions of the volumes of cavities constituting the 'fine' topography that are filled with polymer; (iii) the topography of material outside the contact region. The solution for these three quantities are obtained in terms of the dimensionless contact pressure compliance, $p_g[m, n]$. The simulation procedure involves gradually increasing this quantity's spatial average, $p_{g,0}$, in a series of steps, labeled u=1 . . . U, towards the final value $p_{g,0,U}$. This final value is a function of the linear viscoelastic properties of the imprinted layer and the pressure—time profile of the imprinting process being simulated.

This stepping procedure serves to deal with the geometric nonlinearities that exist in the imprinting of a finite-thickness layer. At each step, the 'resistance' to imprinting is recomputed as a function of position, according to the instantaneous maps of $r[m, n]$ and $p_g[m, n]$ obtained in the previous step.

If the resist model is a Newtonian viscosity and the applied average pressure remains constant with time, then the value of $p_{g,0}$ at a given step is proportional to the imprinting time that has elapsed. In the cases of different viscoelastic models or different pressure—time courses, the value of $p_{g,0}$ is a function of both elapsed time and applied pressure history.

FIG. 12 is a table that includes initial values (i.e., u=1) of variables involved in nanoimprint simulation. For subsequent steps u=2, . . . , U, the following procedure is followed:

Compute $g_{die,u-1}[m, n]$

A kernel $g_{die,u-1}[m, n]$ is generated for an elastic layer on a perfectly hard substrate, using the expressions presented by Nogi and Kato [2] and in the previous chapter. The thickness of the layer is set to the mean value of $r_{u-1}[m, n]$. The kernel is generated on a lateral grid of pitch d. Spatial variation of the residual layer thickness is encapsulated in the quantity $k_{die,u-1}[m, n]$, discussed below. Because we are working in terms of the dimensionless pressure—compliance quantity $p_g[m, n]$, we generate the kernel assuming a dimensionless Young's modulus of $(1-v^2)$ and a Poisson's ratio of $v=0.5$.

Compute $k_{inst,u-1}[m, n]$

The value of $k_{inst,u-1}[m, n]$ at each step is defined as:

$$k_{inst,u-1}[m, n] = \frac{-dw_{local}}{dp_g}[m, n]\bigg|_{r=r_{u-1}} \quad (30)$$

If $S_{u-1}[m, n]$ equals 1 (i.e. the region is in squeezing-dominated mode), then $k_{inst,u-1}[m, n]$ is calculated using the appropriately scaled $dp_g/dr'$ as defined in $$-\frac{dp_{g,0}}{\rho dr'} = F_1(r')^{-3} + F_2(r')^{-2} + F_3.$$

If $S_{u-1}[m, n]$ equals 0 (i.e. the region is in bulk deformation-dominated mode), then $k_{inst,u-1}[m, n]$ is calculated using the appropriately scaled derivative of $V/V_0[m, n]$ with respect to $p_g[m, n]$.

Solve for $p_{g,u}[m, n]$ and the Corresponding Value of $\Delta_u$

At each step, we have specified the spatial-average of the virtual pressure $p_{g,0,u}$. We decompose the solution for $p_{g,u}[m, n]$ into two parts:

$$p^f_{g,u}[m,n] * \left\{ \frac{p_0(t_k)}{p_{g,0,u}} g_{ss}[m,n] \right\} + \qquad (31)$$
$$\{k_{die,u-1}[m,n] p^f_{g,u}[m,n]\} * g_{die,u-1}[m,n] -$$
$$p^f_{g,u}[m,n] k_{inst,u-1}[m,n] = -w_{stamp}[m,n] - r_0 + r_{u-1}[m,n] -$$
$$p_{g,u-1}[m,n] k_{inst,u-1}[m,n] + g_{die,u-1}[m,n] * (k_{die,u-1} p_{g,u-1}[m,n])$$

$$p^e_{g,u}[m,n] * \left\{ \frac{p_0(t_h)}{p_{g,o,u}} g_{ss}[m,n] \right\} + \qquad (32)$$
$$\{k_{die,u-1}[m,n] p^e_{g,u}[m,n]\} * g_{die,u-1}[m,n] -$$
$$p^e_{g,u}[m,n] k_{inst,u-1}[m,n] = 1$$

We have the additional constraint that contact pressure is zero outside C:

$$p_{g,u}[m,n] = 0 \; \forall m, n \notin C. \qquad (33)$$

Pressure distributions $p^f_{g,u}[m, n]$ and $p^e_{g,u}[m, n]$ may be found using the stabilized biconjugate gradient algorithm. Having found these two distributions, we solve for the stamp reference displacement $\Delta_u$ such that:

$$p^e_{g,u}[m,n] + \Delta_u p^f_{g,u}[m,n] = p_{g,u}[m,n] \qquad (34)$$

subject to the constraint that:

$$\sum_{m=1}^{M} \sum_{n=1}^{N} p_{g,u}[m, n] = MN p_{g,0,u}. \qquad (35)$$

Equations (31) and (32) encapsulate the idea that in each simulation step the layer deformation at each location [m, n] may experience change from two sources: (i) the forcing of material from the residual layer into the finely patterned cavities within the region [m, n], as governed by the 'stiffness' coefficient $k_{inst,u-1}[m, n]$, and (ii) the displacement of material laterally between adjacent regions, as governed by $g_{die,u-1}[m, n]$.

The use of a single kernel, $g_{die,u-1}[m, n]$, to represent the lateral transport of material between regions allows the procedure for finding $p_{g,u}[m, n]$ to consist of a simple series of convolutions and multiplications, but does not in itself capture the fact that it requires a larger pressure to force material away from a region with thinner $r_{u-1}[m, n]$ than from a region in which $r_{u-1}[m, n]$ is thicker. The pre-multiplication factor $k_{die,u-1}[m, n]$ is designed to reflect any spatial variation of $r_{u-1}[m, n]$: in (31) and (32) it is multiplied by the trial pressure distribution $p_{g,u}[m, n]$ before convolution with $g_{die,u-1}[m, n]$. In this way, residual layer thickness variation may be approximately accounted for without slowing down the solution procedure. In layers where $r_{u-1}[m, n]$ is everywhere substantially smaller than the lateral pitch d at which $g_{die,u-1}[m, n]$ is defined, $k_{die,u-1}[m, n]$ may be proportional to the cube of $r_{u-1}[m, n]$.

In the convolution expressions of (31) and (32), the kernel $g_{ss}[m, n]$ incorporates both substrate and stamp deflections: since all substrate deflections spring back upon unloading, it is convenient to fold the substrate and stamp deformations into a single kernel. The individual kernels for bending and indentation are as defined above.

$$g_{ss}[m,n] = g_{stamp,bending}[m,n] + g_{stamp,indentation}[m,n] + g_{substrate}[m,n] \qquad (36)$$

The sum of stamp and substrate deflections is then given by the following convolution:

$$w_{D,die,u}[m,n] + w_{D,substrate,u}[m,n] = \frac{p_0(t_h)}{p_{g,0,u}} p_{g,u}[m,n] * g_{ss}[m,n]. \qquad (37)$$

As seen in (31) and (32), and (37), the convolution that yields the stamp and substrate deflections re-scales the trial pressure—compliance distribution, $p_g[m, n]$, to a real instantaneous pressure distribution by using the factor $p_0(t_h)/p_{g,0,u}$. This re-scaling is necessary because the responses of the stamp and substrate are instantaneous and not time-dependent, and their kernels are generated using their true elastic moduli.

Compute $w_{die,u}[m, n]$ and $w_{local,u}[m, n]$

Updated local (feature-level) polymer layer deformations are calculated as follows within the contact region C:

$$w_{local,u}[m,n] = r_0 - r_{inst,u-1}[m,n] - w_{die,u-1}[m,n] - k_{inst,u-1}[m,n] p_{g,u}[m,n] \qquad (38)$$

and the updated polymer layer deformations associated with intra-die interactions are given by:

$$w_{die,u}[m,n] = w_{die,u-1}[m,n] + k_{die,u-1}[p_{g,u}[m,n] - p_{g,u-1}[m,n]] * g_{die,u-1}[m,n]. \qquad (39)$$

Compute $r_u[m, n]$ According to $p_{g,u}[m,n]$

The updated residual layer expression $r_u[m, n]$ is found as an incremental change from $r_{u-1}[m, n]$:

$$r_u[m,n] = r_{u-1}[m,n] + k_{inst,u-1}[m,n](p_{g,u}[m,n] - p_{g,u-1}[m,n]) - [k_{die,u-1}[m,n](p_{g,u}[m,n] - p_{g,u-1}[m,n])] * g_{die,u-1}[m,n] \qquad (40)$$

Compute $V/V_0[m, n]$

In any regions of the stamp that are defined with finely patterned features, the filled proportion of their volume may be estimated according to the conservation of resist volume, using the following relation:

$$\frac{V}{V_0}[m,n] = \frac{w_{local}[m,n] h[m,n]}{1 - \rho[m,n]} \qquad (41)$$

where $h[m, n]$ is the cavity height, and $p[m, n]$ is the areal density of protrusions from the stamp. In places where this solution implies $V/V_0[m, n] > 1$, we clip $V/V_0[m, n]$ to equal 1 and clip $w_{local,u}[m, n]$ correspondingly, to $(1-p)/h$ Compute $k_{die,u}[m, n]$ The scale factors $k_{die,u-1}[m, n]$ account approximately for the effect of the spatial variation of r. Where the spatial average of r is much smaller than d, values of $k_{die,u-1}[m, n]$ are proportional to the cube of $r_{u-1}[m, n]$; where r is much larger than d, $k_{die,u-1}[m, n] \approx 1$. Where r~d, $k_{die,u-1}[m, n]$ may be calculated using a 'feature diameter' assumed to be given by the discretization pitch d and $k_{die,u-1}[m, n]$ and to be inversely proportional to $dp_g/dr'$.

This approach may lose validity if layer thickness variation is a large proportion of the average thickness, and in cases where d<<r but material is displaced laterally at the die-scale over distances that are comparable with or much greater than r.

Update the Squeeze-/Bulk-Deformation Switch $S_u[m, n]$

It is now necessary to update the estimate of which regions of the layer are operating in a squeeze-dominated mode and which are bulk-deformation-dominated. Firstly, the calculated pressure—compliance distribution $p_g[m, n]$ is used to determine residual layer-thickness values $r_{squeeze}[m, n]$ that correspond to squeeze-dominated deformation of the layer (i.e. no cavity filling is considered). Secondly, $p_g[m, n]$ is substituted into $$\frac{V}{V_0} = \begin{cases} \dfrac{p_{g,0} sA/h}{V_{T0}} & p_{g,0} sA/h < 1 \\ 1 - (1 - V_{T0}) \exp\left[\dfrac{1 - p_{g,0} sA/h}{k_f}\right] & p_{g,0} sA/h > 1. \end{cases} \quad (42)$$

The resulting values of $V/V_0[m, n]$ are scaled to give absolute stamp displacements, which are subtracted from $r_0$ to give a set of residual layer-thickness values $r_{bulk}[m, n]$ corresponding to bulk deformation of the layer. In calculating $r_{bulk}[m, n]$, squeezing-limited flow of the residual layer is ignored.

Where $r_{squeeze}[m, n] > r_{bulk}[m, n]$, it is deduced that resistance to squeezing flow of the residual layer is limiting the ability of the stamp to penetrate the layer, and $S_u[m, n]$ is set to 1. Otherwise, it is concluded that movement of the stamp into the layer is bulk deformation-dominated (i.e., limited by forces distributed throughout the whole layer) and $S_u[m, n]$ is set to zero. In this calculation, any lateral displacement of material, $w_{die}[m, n]$, is ignored; the estimate of $S_u[m, n]$ is based solely on the current pressure—compliance distribution.

Update the Contact Set C

At the end of each step, the contact region C is also revised, subject to the constraint that regions [m, n] with a negative pressure in the current solution must be removed from C, while those regions in which the simulated polymer topography overlaps the stamp topography are added to C.

A Strategy for Choosing Step-Size

In order to minimize the number of steps U necessary to complete a simulation, the following approach could be adopted. An initial step size for $p_{g,0}$ is chosen that is typically around 5 or 10% of $p_{g,0,U}$. The solution for that step is performed. If any value of $r[m, n]$ is negative in this new solution, this is taken to indicate that the step-size was too large to represent reality, and the step solution is re-done using a step-size half as large as previously. If, on the other hand, no value of $r[m, n]$ is negative in the new solution, the algorithm advances to the next step by incrementing $p_{g,0}$ twice as much as for the previous step. In this way, the algorithm should gravitate towards the largest step-size that allows the solution to proceed in a stable fashion.

The fidelity of simulation results reduces as the step-size is increased: the pressure—displacement relations of the polymeric layer are linearized at each step, and the larger the step, the further a linearized solution will deviate from reality. Care therefore needs to be taken to restrict the maximum allowable step-size for $p_{g,0}$.

Demonstration of Die-Scale Simulation in 'Flat' Mode

As a demonstration of the simulation method, the experimental results from the imprinting of a simple test pattern with the results of a simulation may be compared while assuming a Newtonian resist model. The simulation is operated here in 'flat' mode, whereby the design of the stamp is discretized at the sub-feature scale and there is no fine topography included in the stamp's description.

Test Pattern

The test pattern includes features that are 5 to 50 μm in diameter and the pattern is arrayed on a square grid with pitch 425 μm. The polarity of the pattern is arranged such that the stamp now contains a series of square and rectangular protrusions.

Experimental Method

The test pattern was transferred to 1 μm of OCG825 photoresist on a 6" silicon wafer. The silicon was etched to a depth of ~1 μm using $SF_6$ chemistry and the resist was stripped using oxygen plasma.

The layer to be imprinted was prepared as follows. 950 kg/mol PMMA, dissolved 3% by weight in anisole, was spun on to a fragment of silicon that was ~10 mm square. The spinning conditions were 2000 rpm for 1 minute. The prepared substrate was baked in an oven at 170° C. for 30 minutes.

The PMMA layer on silicon was then placed into contact with part of the array of test patterns on the silicon stamp. A piece of Neoprene rubber, ~8 mm square and 1 mm thick, was placed on the back of the 10 mm square silicon sample. The stamp/substrate/Neoprene stack was placed between the platens of the hot embossing apparatus described in Chapter 2. The platens were heated to 165±1° C. and a sample-average pressure of 40 MPa was applied for two minutes. The platens were then cooled to approximately 90° C. and the load was removed.

Metrology

A few small scratches were made through the imprinted resist layer to enable the position of the PMMA/silicon interface to be determined. Several regions of the sample were photographed in an optical microscope and the interferogram obtained from one particular copy of the test pattern near the center of the sample.

FIG. 13a-13c illustrate optical micrographs and white-light interferometry cross-sections of test patterns. In FIG. 13a experimental results obtained from one particular copy of the test pattern near the center of the sample are shown. The color density of each region of the interferogram can be used to infer the approximate thickness of the imprinted layer.

To gain more precise measurements of the imprinted topography, a white-light interferometer (Zygo NewView) was used. The PMMA layer is transparent and its thickness is too small to use white-light interferometry directly on the sample: reflections from the PMMA/Si interface would have made it impossible for the interferometer's software to determine the true position of the PMMA/air interface. Depositing a reflective layer (e.g., sputtered gold) on the sample to stop light from penetrating the PMMA layer was also not feasible: the required thickness of the deposited layer would have been comparable to the relief of the imprinted topography. Instead, Sylgard 184 PDMS was cast on to the imprinted sample, cured at 80° C. for six hours, and then peeled from the sample. This PDMS casting was sufficiently thick that white-light interferometry could be used directly on the surface of the casting without encountering parasitic reflections from the flat back-side of the PDMS layer. The topographies obtained were then simply flipped to give a representation of the imprinted PMMA topography.

It is known that white-light interferometry can produce erroneous data near step-changes in topography, and indeed the data obtained from this sample do exhibit sharp spikes near feature edges. We cannot be sure whether these spikes are real or artifacts of the measurement procedure, and so the data were smoothed before being plotted in FIG. 13a.

Figure 14:
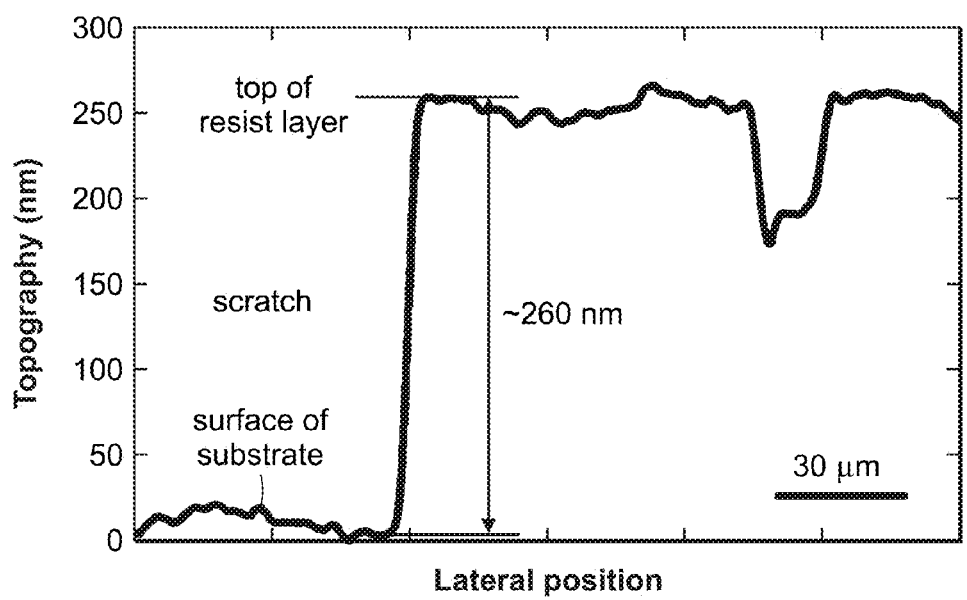
FIG. 14 is a plot that illustrates determination of initial PMMA layer thickness using scanning white-light interferometry results.

FIG. 14 is a plot that illustrates determination of initial PMMA layer thickness using scanning white-light interferometry results. The spun-on PMMA layer thickness was determined to be approximately 260 nm by looking at the step-height of PMMA at the edge of one of the scratches introduced to the PMMA samples. This measurement was performed in a region of the sample that had not made contact with any part of the stamp.

Newtonian Simulation

The simulation method described above was used to simulate the embossing of this PMMA sample. A Newtonian resist model was chosen with a viscosity of $5 \times 10^7$ Pa·s, which is a plausible value for PMMA at 165° C. according to the data reported by Han [3]. The stamp and substrate, which are both silicon, are modeled with Young's modulus 160 GPa and Poisson's ratio 0.27. The nominal number of simulation steps, U, was set to 10.

The simulation results are plotted in FIG. 13b. The simulated optical interferogram was constructed assuming a refractive index of 1.49 for PMMA. The simulation, which was discretized at a lateral pitch of 1 μm, took approximately six minutes to run.

Substantial stamp/substrate deformation is predicted by the simulation, leading to variation of the simulated depth of imprinting by more than a factor of two across the pattern. The general shape of these stamp deflections, whereby the larger features are imprinted to a much shallower depth than the narrower ones, roughly follows that of the experimental data. Tracking the simulated contact pressure distribution over time, it can be seen that the pressure is initially higher in the region of the small, sparse stamp protrusions near the lower left corner of the pattern, but that as the resist is progressively imprinted in these regions the bulk of the contact pressure transfers to the wider features on the upper and right-hand sides of the pattern.

It is important to note that this topographical nonuniformity is predicted in the absence of any 'springback' of the resist material itself: the nonuniformity is entirely attributable to deflections of the stamp and substrate.

Since it would be difficult to increase the stiffness of the stamp much above that of silicon, it is apparent that, for a pattern of this nature, an improvement of residual layer uniformity would require either a substantial extension of imprinting time, or a substantial reduction of resist viscosity enabling imprinting to be carried out at much lower pressures.

The prediction of this Newtonian resist model is far from perfect, however: the exact measured topography of resist within each of the larger features is not well captured. The experimental data in fact show much sharper gradients of topography near the edges of these larger features, indicative of shear-thinning behavior.

Modeling Shear-Thinning

In order to represent shear-thinning in simulation, certain embodiments deal only with viscous (not viscoelastic) resist materials. The idea is to perform the simulation in a series of explicit time-steps, with each step u made up of two components. In the first component, the contact pressure distribution is estimated using a linear viscous model for the resist and taking as one of its inputs the layer topography $r_{u-1}[m,n]$ from the previous step, u−1. The following equations are defined in terms of real pressures p[m, n]:

$$p_u^f[m,n]*g_{ss}[m,n]+\{k_{die,u-1}[m,n]p_u^f[m,n]\}*g_{die,u-1}[m,n]\Delta t=-w_{stamp}[m,n]-r_0+r_{u-1}[m,n] \quad (43)$$

and $$p_u^e[m,n]*g_{ss}[m,n]\pm\{k_{die,u-1}[m,n]p_u^e[m,n]\}*g_{die,u-1}[m,n]=1. \quad (44)$$

Δt is the length of step u, and $k_{die}$ and $g_{ss}$ are as defined above. Here, $g_{die,u}$ is generated by substituting a 'Young's modulus' of $3\eta_0$ into the function defined by Nogi and Kato, where $\eta_0$ is the zero-shear viscosity of the layer. The layer thickness substituted is the spatial average of the layer thickness $r_{u-1}[m, n]$ from the previous step. We have the additional constraint that contact pressure is zero outside C:

$$p_u[m,n]=0 \, \forall m,n \notin C. \quad (45)$$

Pressure distributions $p_u^f[m, n]$ and $p_u^e[m, n]$ are found using the stabilized biconjugate gradient algorithm. Having found these two distributions, we solve for the incremental stamp reference displacement $\Delta_u$ such that:

$$p_u^e[m,n]+\Delta_u p_u^f[m,n]=p_u[m,n] \quad (46)$$

subject to the constraint that:

$$\sum_{m=1}^{M}\sum_{n=1}^{N} p_u[m,n] = MN p_{0,u}. \quad (47)$$

An amount of linear viscous flow consistent with this pressure distribution $p_u[m, n]$ and with the length Δt of the time-step is then computed:

$$\Delta r_{lin,u}[m,n]=-(p_u[m,n]k_{die,u-1}[m,n])*g_{die,u}[m,n]\Delta t. \quad (48)$$

In the second component of each step, an additional amount of plastic flow associated with shear-thinning is computed. We expect the rate of additional flow at a given location in the resist to be related to the magnitude of in-plane shear stress at that location. The magnitude of in-plane shear stress can readily be calculated from the contact-pressure distribution $p_u[m, n]$ by way of two additional kernel functions defined by Nogi and Kato. Where the plane of the resist is x–y, the Fourier transforms of the in-plane shear stresses in the layer arising in response to unit pressure applied at location [0, 0] are given by:

$$S_{yz}[m,n] = -\sqrt{-1}\left[\frac{m\pi}{Nd}\alpha(A-\tilde{A})+z\frac{n\pi}{Nd}\alpha(B-\tilde{B})\right]$$
$$S_{zx}[m,n] = -\sqrt{-1}\left[\frac{n\pi}{Nd}\alpha(A-\tilde{A})+z\frac{m\pi}{Nd}\alpha(B-\tilde{B})\right] \quad (49)$$

where $$\alpha = \sqrt{\left(\frac{m\pi}{Nd}\right)^2+\left(\frac{n\pi}{Nd}\right)^2}; \lambda=-1; \kappa=-1 \quad (50)$$

$$A = \lfloor 0.5(\kappa-\lambda-4\kappa\alpha^2 r_{mean}^2)\exp(-2\alpha r_{mean})\rfloor R\exp(-\alpha z)$$
$$\tilde{A} = \lfloor 0.5(\kappa-\lambda-4\kappa\alpha^2 r_{mean}^2)\exp(-2\alpha r_{mean})\rfloor R\exp(-\alpha z)$$
$$B = [1-(1-2\alpha r_{mean})\kappa\exp(-2\alpha r_{mean})]\alpha R\exp(-\alpha z)$$
$$\tilde{B} = [1+2\alpha r_{mean}-\lambda\exp(-2\alpha r_{mean})]\kappa\exp(-2\alpha r_{mean})\alpha R\exp(-\alpha z)$$

$$R = -\lfloor 1-(\lambda+\kappa+4\kappa\alpha^2 r_{mean}^2)\exp(-2\alpha r_{mean})+\lambda\kappa\exp(-4\alpha r_{mean})\rfloor^{-1}\alpha^{-2}.$$

The thickness defined for the layer, $r_{mean}$, is the spatial average of $r_{u-1}[m, n]$. The functions above are defined for an incompressible layer and a perfectly stiff substrate (substrate compliance is allowed for elsewhere, in $g_{ss}[m, n]$). The quantity z is the distance between the top surface of the layer and the plane in which shear stresses are expressed; shear stress at a particular location [m, n] is proportional to z, provided that $z \leq r_{mean}$. $S_{yz}[m, n]$ and $S_{zx}[m, n]$ are evaluated over a range of 2N in both m and n, taking z=0.5r so that the shear stresses computed are those half-way through the thickness of the layer. The values of $S_{yz}[0,0]$ and $S_{zx}[0,0]$ are undefined according to equation (49); however, the average value of shear stress in the layer in response to a normally applied load is zero, so we set both $S_{yz}[0,0]$ and $S_{zx}[0,0]$ to zero. After inverse Fourier transformation of $S_{yz}[m, n]$ and $S_{zx}[m, n]$, the central N×N regions of the resulting matrices are taken as the kernel functions, $s_{yz}[m, n]$ and $s_{zx}[m, n]$, for use in simulation.

The in-plane shear stress components are then given by convolution:

$$\tau_{yz}[m,n]=s_{yz}[m,n]*p_u[m,n]; \tau_{zx}[m,n]=s_{zx}[m,n]*p_u[m,n]. \quad (51)$$

We define the magnitude of in-plane shear stress as follows:

$$\bar{\tau}_u[m,n]=\sqrt{\tau_{yz}^2[m,n]+\tau_{zx}^2[m,n]}. \quad (52)$$

For any given temperature there is a breakpoint in strain-rate above which a Newtonian model ceases to hold and viscosity falls with increasing strain rate. From the perspective of shear stress, this behavior can be described in terms of the existence of a yield stress, below which the rate of resist flow is proportional to stress and above which it increases super-linearly with stress. Since we are trying to express an additional incremental amount of plastic flow $\Delta r_{thinning,u}[m,n]$ beyond that implied by a Newtonian model, we propose the following expression:

$$\Delta r_{thinning,u}[m, n] = \quad (53)$$
$$-(p_u[m, n]k_{die,u-1}[m, n])\max[\bar{\tau}_u[m, n] - \tau_{yield}, 0]^b \frac{k_{shear}\Delta t}{\eta_0}.$$

where $\tau_{yield}$ is a yield shear stress for the layer, $k_{shear}$ is a constant depending on the thickness of the layer and the pitch d of discretization, and b is an exponent describing the shear strain rate's dependence on shear stress.

The layer topography $r_u[m, n]$ that is carried forward to the next step is then given by:

$$r_u[m,n]=r_{u-1}[m,n]+\Delta r_{lin,u}[m,n]+\Delta r_{thinning,u}[m,n] \quad (54)$$

The overall idea of this approach is that by calculating the evolving pressure distribution with a linear model, we can still use the convolution approach of the previous sections, and the speed of solution will be much greater than if the non-linear shear-thinning model were to be integrated in the pressure-solution step. The value of $r_u[m, n]$ is updated separately at the end of each step, in order to keep track of the additional, shear-thinning-related flow.

In trying to implement this approach, it was found that after the first complete solution step the calculated pressure distributions started to become very rough indeed. Further work is needed to resolve these numerical problems. An illustration of the scheme, however, can be provided by looking at the output of the model after just one step, where that step has been specified to have a length equal to the entire duration of the imprinting cycle. Such an illustration is given in FIG. 13(c). The simulation was performed at a lateral discretization, d, of 1 µm. The value of b found to represent experimental results effectively was 0.4, that of $\tau_{yield}$ was 0.45 MPa, and that of $k_{yield}$ was $5.1\times10^{-5}$ m/(Pa$^{0.4}$). The duration of the loading cycle was 120 s, the pattern-average applied pressure was 40 MPa, and the zero-shear viscosity specified was $5\times10^7$ Pa·s. Elastic properties of the stamp and substrate were as described above. The simulation results shown in FIG. 13(c) bear a substantially closer resemblance to the experimentally obtained topography (FIG. 13(a)) than does the simulation that assumes a Newtonian resist (FIG. 13(b)). The shear-thinning simulation successfully represents the bands of ~10 µm width around the edges of the larger features have been imprinted deeply into the resist layer. These bands correspond to the locations of in-plane shear stresses that exceeded the fitted yield stress of 0.45 MPa.

Because only one simulation step was used here, we cannot expect the accuracy of the simulated topography—or indeed the validity of the extracted values of b, $\tau_{yield}$ and $k_{yield}$—to be particularly high. Even so, the proposed method of using in-plane shear stresses to compute the locations of shear-thinning behavior does appear promising. The total simulation time for this crude, single-step solution was only two minutes.

The PMMA sample analyzed here was processed under conditions where a great amount of shear thinning evidently occurred. In many realistic imprint cases, though, the resist would be processed much further above $T_g$, so that its behavior would in general be much closer to Newtonian. Therefore, we expect the incorporation of shear-thinning computations to be required in some, but by no means all, nanoimprint simulations.

Computing Stamp Deflections when Cavities Fill Quickly with Resist

In some imprint cases, the viscosity of the resist upon application of the stamp is sufficiently low that all stamp cavities are readily filled during the loading cycle. In these cases, it may be safe to begin with the assumption that every part of the stamp is in contact with resist material and to proceed from there with a solution for the deflections of the stamp and substrate. When this assumption is possible, we can avoid the simulation time that would have been taken to estimate the size and shape of the contact region.

In cases where the cavities of the stamp are completely filled with polymer, and assuming that the resist material is a viscous incompressible fluid (which is to be expected if the resist is able to fill the stamp quickly), the only net motion of stamp towards substrate will be that associated with global squeezing of resist towards the edges of the wafer. Within a small, die-sized region of the stamp or wafer, we could characterize the velocity of the stamp as being infinitesimally small and uniform across the region.

Our current simulation methods implicitly assume any modeled pattern to be both periodic and infinite in lateral extent, and it is impossible within this framework for there to be a non-zero steady-state uniform velocity of the stamp when all cavities are filled and the resist is incompressible: net lateral transport of material into or out of the simulation region is inconsistent with its boundary conditions. Yet we know this to be an imperfect representation of a wafer being imprinted: some small amount of material can be squeezed laterally from die to die, towards the edge of the wafer. We therefore make the approximation of neglecting the very small global squeezing motion of the stamp and finding a quasi-steady-state pressure distribution that gives zero stamp velocity at every location within the simulation region.

In the 'flat' simulation approach described in the previous section, the contact pressure scaling factor $k_{die}$ was introduced to capture the idea that, for a particular pressure applied to any given region of a resist layer, the region squeezes down more slowly the thinner it is. Where the lateral dimensions of the imprinted pattern are substantially larger than the layer thicknesses, it was proposed that $k_{die}$ should be proportional to the cube of local thicknesses, reflecting the known properties of squeeze-film flow. The concept of $k_{die}$ is also applied here in the filled-stamp case, the reason being that just before quasi-steady-state was achieved, there was the possibility of motion of the stamp and these squeezing rules would have applied. The following relation is considered to hold for step u of an iterative solution process:

$$(k_{die,u-1}[m,n]p_u[m,n])*g_{die,u-1}[m,n]=0 \qquad (55)$$

If the layer were uniform in thickness, $k_{die}$ would be 1 everywhere and $p_u$ would be uniform, whatever the shape and amplitude of $g_{die}$. Based on equation (55) alone, the magnitudes of $p_u[m, n]$ are indeterminate, but their spatial average is usually specified for any imprinting process.

If we have an estimate of the current residual layer thickness $r_{u-1}[m, n]$, we can directly estimate $k_{die,u-1}[m, n]$, and hence $p_u[m, n]$, which is expected to be inversely proportional to $k_{die,u-1}[m, n]$ and is subject to the constraint that its spatial average must equal the applied imprinting pressure. The deflections of the stamp and substrate can then be straightforwardly computed by convolving $p_u[m, n]$ with the elastic point-load response function of silicon. Based on stamp and substrate deflections, revised estimates of $r_u[m, n]$ and hence $k_{die,u}[m, n]$ can be made. The more iterations performed, the more accurate the simulation is expected to be.

The initial values of the resist layer thicknesses $r_1[m, n]$ are estimated by assuming the stamp to be un-deformed but embedded in the resist such that the resist's initial volume is displaced to fill all stamp cavities.

It is important to note that is it not necessary to know the absolute viscosity of the resist to employ this method: merely the topography and elasticity of the stamp and substrate, the initial resist layer thickness, and the spatial average of p[m, n].

This approach was used in an attempt to simulate the reported experimental results of Pedersen et al., who used a silicon stamp to imprint simple patterns into mr-I 7030 resist [1]. Imprinting was performed at 140° C. under 0.65 MPa for 5 minutes. The relief of the stamp was 300 nm and the apparent initial polymer layer thicknesses approximately 360 nm. Pedersen et al. measured the residual layer thickness variation across the resist patterns after removal of the stamp.

The reported imprinting temperature is well above the literature value of 60° C. for this particular resist's glass-transition temperature. There is no evidence in the reported results of elastic springback of the residual layer (even though the authors refer to it), so it seems appropriate to adopt a purely viscous model for this simulation. The zero-shear viscosity of mr-I 7000-series resists at 140° C. has been reported by its manufacturers to be $4 \times 10^3$ Pascal [3]. This viscosity is about four orders of magnitude lower than that of the PMMA processed at 165° C. in the previous section, so it is reasonable that stamp cavities would be expected to fill comparatively quickly with this mr-I resist.

The lateral extent of the patterns shown in Pedersen's work is ~1.5 mm, and we assume that there were no stamp protrusions in the region surrounding them, so we choose to model a region that is 3 mm square and otherwise empty, with the expectation that the pattern periodicity implicit in our approach will then not substantially perturb results. For the silicon stamp and substrate, a Young's modulus of 130 GPa and a Poisson's ratio of 0.27 are assumed.

FIG. 15a-15c illustrate results of the cavity filled simulation. The shape and magnitude of stamp deformation have been modeled quite successfully using the known properties of the silicon stamp and substrate and the known applied average pressure.

In attempting to represent the imprinting of a modified grating with dummy features at the sides, the approach as described so far in this section is less successful. In FIG. 15a (Approach 1), the results of the basic simulation method are shown: they do not fully capture the observed center-high 'bulge' of residual layer thickness of Pedersen et al. In this experimental case, resist material in the central five stamp cavities is laterally enclosed on all four sides by stamp protrusions. It might therefore be appropriate to regard this material as being 'unavailable' for lateral flow. In that case, $k_{die}$ in these regions should be set to the value consistent with a residual layer thickness that does not include this unavailable material.

FIG. 16 illustrates the concept of a region of laterally enclosed resist in a filled cavity or cavities. The effect of this modeling change is to increase substantially the simulated contact pressure in the regions containing resist material that is 'unavailable' for flow. At each iteration step, any material 'unavailable' for flow does of course continue to contribute to the total volume of resist under the stamp.

Making this change manually to the simulation approach, a stamp deflection profile is obtained that is much closer to that measured experimentally: FIG. 15b (Approach 2). Ten iteration steps u were found to be ample to obtain a stable solution, and each of the simulations shown was computed within ~10 s using the equipment described earlier in this thesis. Because the contact set is full, there is no need to solve iteratively for a pressure distribution at each step u: the simulation simply consists of a series of forward convolutions followed by direct re-computation of $k_{die}$ and r.

While no firm conclusions can be drawn by studying this single experimental sample, the example presented here suggests three things. Firstly, it is possible that when a resist material readily fills stamp cavities, stamp deflections and hence residual layer nonuniformity can be computed much more quickly than in cases where the contact region has to be predicted through simulation. Secondly, although Pedersen et al. interpret 'springback' of the resist layer itself as a cause of the residual layer thickness nonuniformity, our model indicates that stamp and substrate deflection alone can explain the profiles observed. Thirdly, in cases where the stamp cavities are completely filled, it may be necessary to distinguish between cavities that are completely laterally enclosed and those that are open on one or more sides.

This third observation, if correct, potentially creates the need for additional algorithms to detect fully laterally enclosed cavities in arbitrary patterns. Further experimentation will clearly be needed to establish how best to model filled-stamp cases.

A Refined Approach to Die-Scale NIL Simulation

The above analysis of Pedersen's experimental results indicated that when a layer of material being imprinted varies laterally in thickness, the pressure at a particular point in the layer depends not only on the local thickness but also on the extent to which that material is laterally constrained. For example, a particularly thick portion of a layer fully surrounded by much thinner portions will be rather harder to reduce in thickness by squeezing than will a region of that particular thickness surrounded by thicker regions.

As explained above, in a die-scale simulation approach the quantity $k_{die}[m, n]$, linking local contact pressure to the resulting displacement of material away from point [m, n], is defined as a function of the instantaneous layer thickness at point [m, n] alone. For layers much thinner than the lateral pitch of the simulation grid, $k_{die}[m, n]$ was proposed to be proportional to the cube of the local layer thickness. If residual layer thickness changes very gradually with lateral position, this existing approach can be satisfactory, but in cases where stamp cavities and hence layer thicknesses exhibit step-changes in height (as in almost any feature-scale simulation) the existing approach implies step changes in local pressure and is not likely to produce realistic results.

What is needed instead is a method that accounts for the degree of lateral confinement of each portion of an imprinted layer.

A simple way of accounting for the lateral confinement of material is suggested here. We present the idea in two-dimensional form although it is expected that the method could be readily extended to three dimensions. FIGS. 17a-17b illustrate a generalization of the simulation of thin-layer squeezing for varying layer thicknesses and lateral constraints (1-D case). For comparison, FIG. 17a shows the method that has been employed thus far: the mechanical impulse response function of a viscous imprinted layer effectively takes the form of a triplet, provided that the pitch of lateral discretization is much larger than the layer thickness. For the squeezing of an infinitely long strip of material between a rigid stamp protrusion and a rigid substrate, a parabolic pressure distribution is consistent with this kernel function and with theory. In FIG. 17b, in contrast, we consider the case in which the same layer material is in contact with a rigid stamp protrusion having half the width of that in FIG. 17a. The left-hand side of the layer material is prevented from moving leftwards by a 'sluice', attached to the stamp that is imagined to mate with the substrate, forming a perfect seal. By symmetry, therefore, we expect the pressure distribution in this layer to be identical to that in one half of the layer illustrated in FIG. 17a.

We now decompose the impulse response of the layer into two parts: one, $g_A[n]$, representing the displacement of material rightwards from the point of application of a load, and another, $g_B[n]$, representing leftwards displacement. Note that the sum of these sub-kernels equals the triplet kernel in FIG. 17a. We also define two so-called 'masking' functions, $k_A[n]$ and $k_B[n]$, which describe any lateral constraints on rightwards and leftwards material displacement respectively. In this simple case, there are no constraints on rightwards material displacement, and $k_A[n]$ equals 1 everywhere, but there is a constraint preventing leftwards displacement of material from the leftmost region of the imprinted layer, and $k_B$ consequently equals zero in that region and one elsewhere. We then find the pressure distribution p[n] that is the solution to the following set of linear equations:

$$\frac{dr[n]}{dt} = g_A[n] * (k_A[n]p[n]) + g_B[n] * (k_B[n]p[n]) \quad (56)$$

where r[n] is the topography of the upper surface of the imprinted layer, and the material is assumed to exhibit Newtonian viscosity. Additionally, p[n] is constrained to be zero outside the region of stamp—layer contact. As shown in FIGS. 17a-17b, the pressure distribution found with this method is the half-parabola expected.

In cases where there are step changes in layer thickness rather than the complete blockage of lateral material flow, $k_A[n]$ and $k_B[n]$ could take values other than zero or one. We suggest the following rule for setting their values based on instantaneous layer thicknesses r[n]:

$$k_A[n] = \frac{\min(r[n]^3, r[n+1]^3)}{r_0^3} \quad (57)$$

$$k_B[n] = \frac{\min(r[n]^3, r[n-1]^3)}{r_0^3}$$

where $r_0$ is the average layer thickness across the simulation region and the amplitudes of $g_A[n]$ and $g_B[n]$ are computed for a layer of thickness $r_0$. FIGS. 18a-18e includes examples of uses of the decomposed-kernel approach to simulate several one-dimensional geometries.

The approach to calculating $k_A[n]$ and $k_B[n]$ was used to produce the pressure simulations that are illustrated in FIG. 18a-18c. FIGS. 18a-18b reiterate the cases illustrated in FIGS. 17a-17b; meanwhile FIG. 18c shows a case in which the 'sluice' at the left-hand side of the contact region has a finite opening height and is able to transmit some material. In FIG. 18d a split-level stamp is illustrated, where simulations have been performed for a range of height ratios. FIG. 18e illustrates a case in which a stamp protrusion has had a taller cavity introduced at its center, and we see that as the height of the cavity increases, the pressure within that cavity approaches a uniform distribution.

This simulation method may be performed iteratively, with small steps in layer thickness being computed along with evolution of the stamp—layer contact set. Validation of this method may be provided by comparing its predictions to those of full solutions of the Navier-Stokes equations for some test geometries. We anticipate that this method may be extended to three-dimensional simulation by employing four or eight sub-kernels, one corresponding to each topographical cell neighboring any given location.

In cases where the pitch of lateral discretization is comparable to or less than the layer thicknesses, the kernel is not able to be simplified to a triplet as it was in FIG. 17a. It may however still be possible to use a modified form of this approach and to decompose an appropriate non-triplet kernel function into several directional sub-kernels.

The simulation approach is fast to run and the resolution with which results are delivered can be arbitrarily specified. A simulation using a 64×64 matrix-representation of a pattern has been successfully completed in less than a minute. Outputs of the model are residual layer thickness, contact pressure distribution, and the proportions of cavity volumes filled.

The use of a particularly soft stamp material has the effect of producing imprinted 'grooves', located at the edges of stamp features and with a width comparable to that of the imprinted layer. This effect can be exploited to create small features in resist from much larger ones on a stamp.

In nanoimprint lithography, what is needed from simulation is not simply a prediction of whether stamp cavities will fill with polymer, but also an impression of the uniformity of thickness of the polymer's residual layer. Certain embodiments of the present invention simulate nanoimprint and provide both of these required model outputs. Although the description herein focuses on the kind of nanoimprint in which a uniform layer of thermoplastic polymeric resist is spun on to a hard substrate and then imprinted, various nanoimprint problems may be approached using aspects of the present invention.

Figure 19:
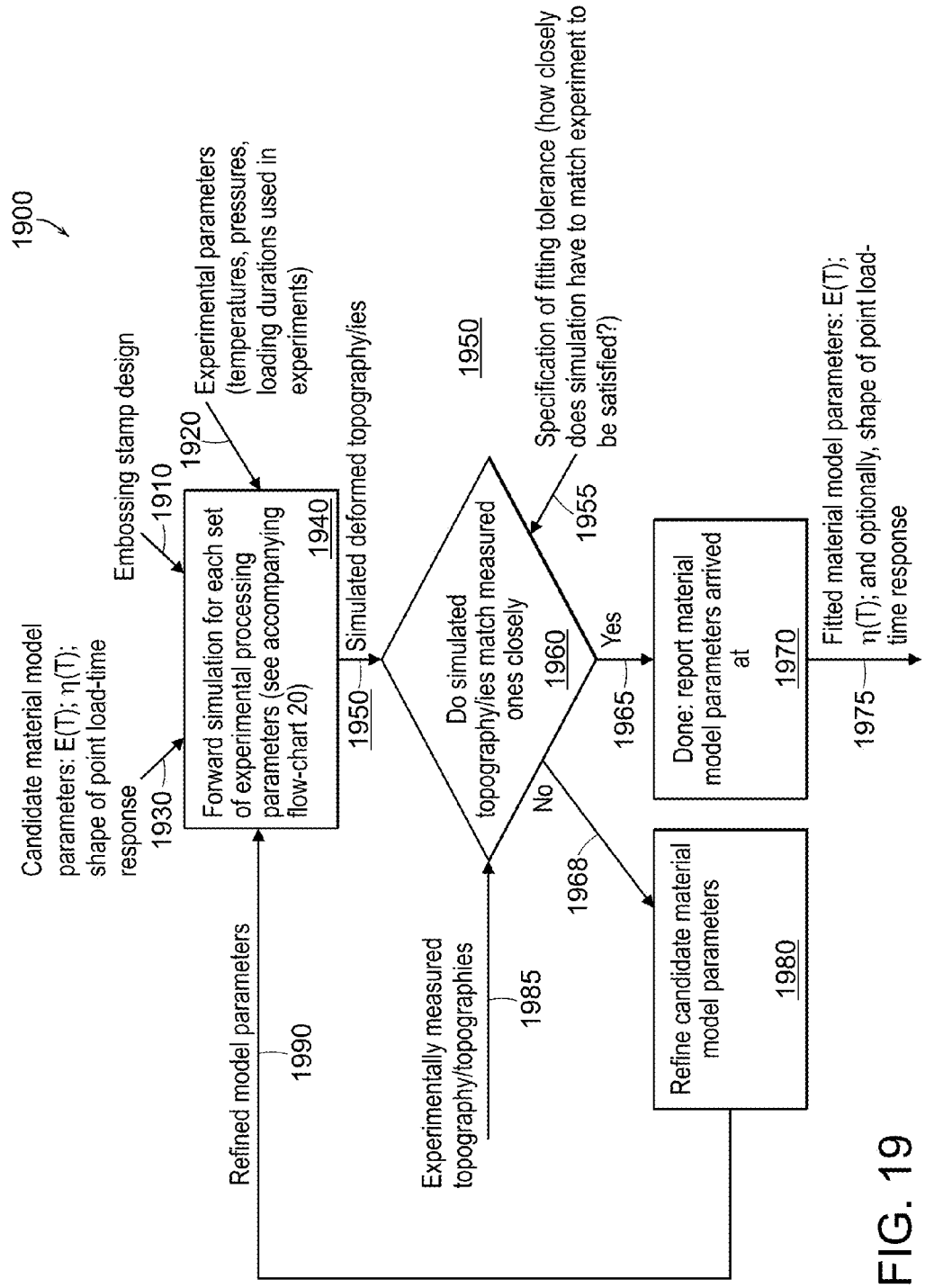
FIG. 19 is a flow diagram of an example embodiment of the present invention for modeling deformation of a deformable body embossed with a stamp.

FIG. 19 demonstrates an example embodiment 1900 of the present invention 1900 for iterative fitting of material parameters of deformable body. The example embodiment 1900 employs embossing stamp design 1910, experimental parameters 1920 (such as temperatures, pressures, loading durations used in experiments), and candidate material model parameters 1930 (such as E(T), η(T), shape of point load-time response) to obtain simulated deformed topography (or topographies) of a deformed body 1950. The example embodiment 1900 employs forward simulation for each set of experimental processing parameters (shown later in FIG. 20) 1940.

The example embodiment 1900 determines if the simulated topographies match measured topographies closely 1960. If so 1965, the example embodiment 1900 reports the obtained material model parameters 1970. If the example embodiment 1900 determines that the simulated topographies do not match measured topographies closely 1968, the example embodiment 1900 refines candidate material model parameters 1980 and forwards the refined model parameters 1990 for so that forward simulations can be repeated 1940. In determining whether or not the simulated topographies match measured topographies closely 1960, the example embodiment 1900 may consider other factors such as specification of fitting tolerance 1955 (i.e., how closely does the simulation have to match the experiment to be satisfied), and experimentally measured topography (or topographies).

Figure 20:
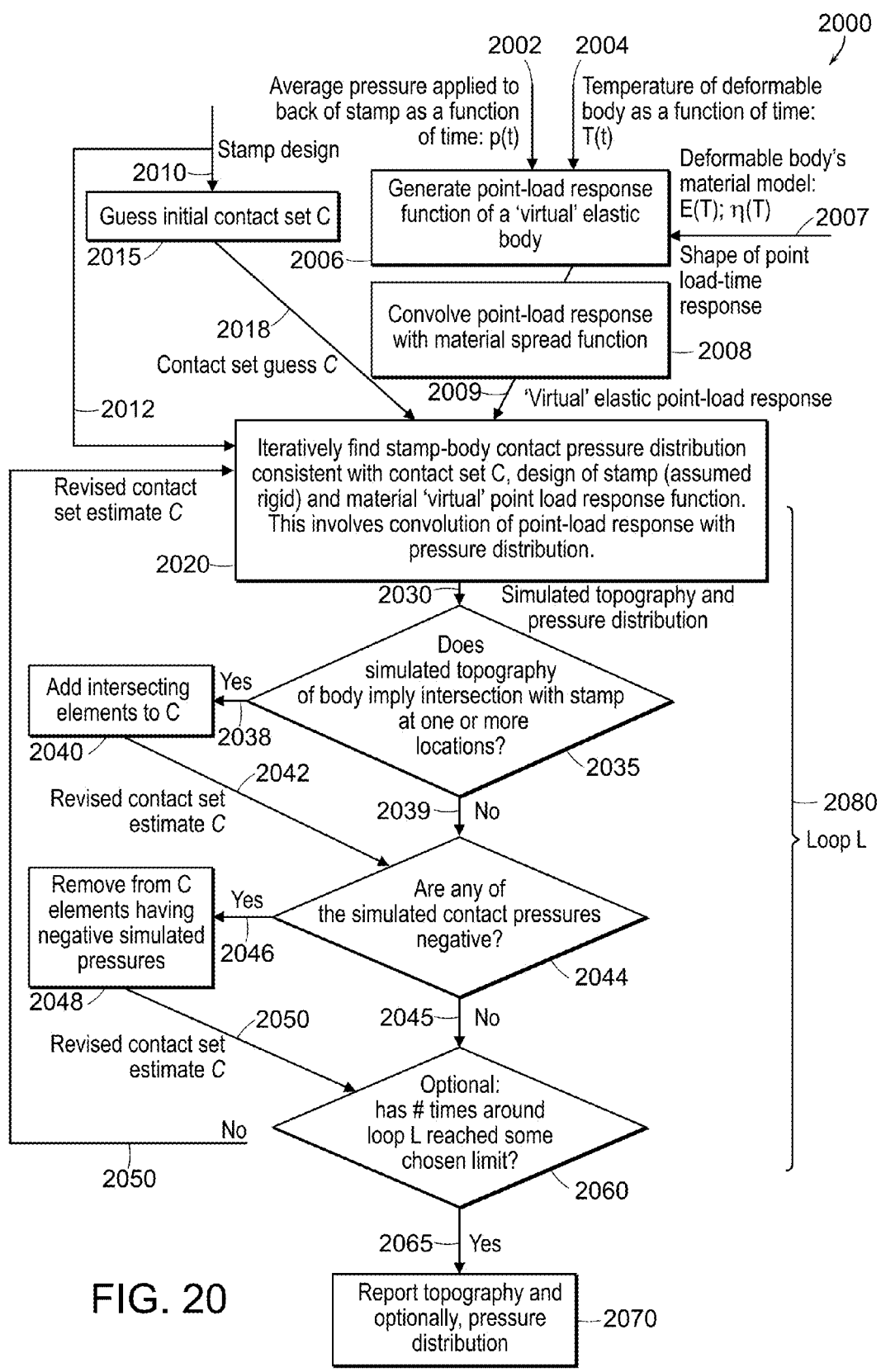
FIG. 20 is a flow diagram of an example embodiment of the present invention for determining a displacement of material in an embossed substrate.

FIG. 20 is a high level flow chart of the forward simulation procedures according to an example embodiment 2000 of the present invention 2000. The example embodiment 2000 generates point load response function of a virtual elastic body 2006 based on the average pressure applied to back of stamp as a function of time 2002, temperature of deformable body as a function of time 2004, and the material model of the deformable body as well as the shape of point load-time response 2007. The example embodiment optionally (for thin deformable layers) may convolve the point load-time response with material spread function 2008.

The example embodiment 2000 employs the stamp design 2010 and sets an initial guess for contact set C 2015. The example embodiment 2000 employs the virtual elastic point load response 2009, the stamp design 2012, and the contact set guess 2018 to iteratively find the stamp body contact pressure distribution that is consistent with contact set C, design of stamp (assumed rigid), and material virtual point load response function. This involves convolution of point load response with pressure distribution 2020.

The example embodiment 2000 employs the simulated topography and pressure distribution 2030 to determine whether the simulated topography of the deformable body implies intersection with stamp at one or more locations 2035. If so 2038, the example embodiment 2000 adds intersecting elements to C 2040 and employs the revises contact set estimate C 2042 to determine if any of the simulated contact pressures are negative 2044. If the simulated topography of the deformable body does not imply intersection with stamp at one or more locations 2045, the example embodiment 2000 proceeds to determine if any of the simulated contact pressures are negative 2044. If so 2046, the example embodiment 2000 removes from C elements having negative simulated pressures 2048 and revises contact set estimate C 2050. If not 2045, the example embodiment 2000 optionally may determine if the number of iterations around the loop L 2080 has reached a predetermined number 2060. If not 2068, the example embodiment 2068 repeats the loop L 2080 using the revised contact set estimate C 2050. If the number of iterations around the loop L 2080 has reached a predetermined number 2060, the example embodiment reports topography and optionally pressure distribution 2070.

Figure 21:
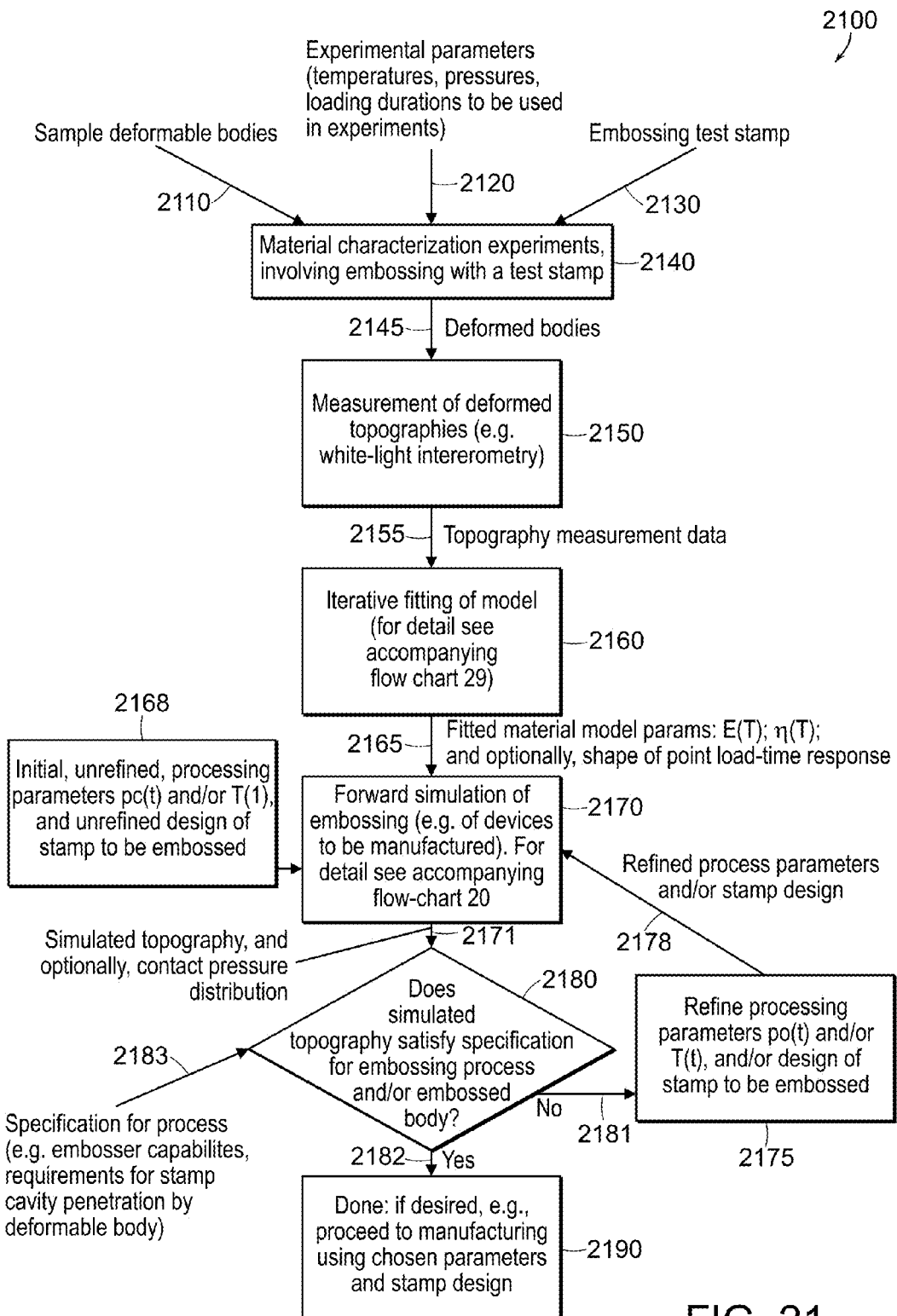
FIG. 21 is a flow chart of an example embodiment of the present invention for determining a displacement of a material in a thermoplastic embossed with a stamp.

FIG. 21 is a flow chart of an example embodiment 2100 of the present invention. The example embodiment 2100 employs Sample deformable bodies 2110, experimental parameters (such as temperatures, pressures, loading durations to be used in experiments) 2120, and embossing test stamp 2130 to deform deformable bodies and perform material characterization experiments, involving embossing with a test stamp 2140.

The example embodiment 2100 employs the deformed bodies 2145 to obtain measurement of deformed topographies (e.g. using white-light interferometry) 2150. The example embodiment 2100 employs the topography measurement data 2155 for iterative fitting of model (shown in FIG. 19) 2160. The example embodiment 2100 employs the fitted material model parameters 2165 such as $E(T)$, $\eta(T)$, and optionally shape of point load-time response are in forward simulation of embossing (e.g. of devices to be manufactured) 2170 and verifies if simulated topography satisfy specification for embossing process and/or embossed body 2180 (specification for process (e.g. embosser capabilities, requirements for stamp cavity penetration by deformable body 2183 may also be considered in this decision making process). If so 2182, the example embodiment 2100 proceed to manufacturing using chosen parameters and stamp design. If not 2181, refines processing parameters $p_0(t)$ and/or $T(t)$, and/or design of stamp to be embossed 2175 and repeats the forward simulation of embossing 2170.

The example embodiment 2100 may also employs initial, unrefined, processing parameters $p_0(t)$ and/or $T(t)$, and unrefined design of stamp to be embossed 2168 in the forward simulation of embossing 2170.

It should be understood that procedures, such as those illustrated by flow diagram or block diagram herein or otherwise described herein, may be implemented in the form of hardware, firmware, or software, executed in any device such as a general purpose computer or an application specific computer. If implemented in software, the software may be implemented in any software language consistent with the teachings herein and may be stored on any computer-readable medium known or later developed in the art. The software, typically, in form of instructions, can be coded and executed by a processor in a manner understood in the art.

An alternative embodiment of the claimed invention is presented in "Towards Nonoimprint Lithography-Aware Layout Design Checking," by Hayden Taylor and Duane Boning, (*Proc. SPIE, Vol.* 7641, 764129, Apr. 2, 2010).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

References, all of which are incorporated by reference in their entirety:

[1] R. H. Pedersen, L. H. Thamdrup, A. V. Larsen, and A. Kristensen, "Quantitative Strategies to Handle Stamp Bending in NIL," in *Proc. Nanoimprint and Nanoprint Technology*, 2008.

[2] T. Nogi and T. Kato, "Influence of a hard surface layer on the limit of elastic contact—Part I: Analysis using a real surface model," *Journal of Tribology, Transactions of the ASME*, vol. 119, 1997, pp. 493-500.

[3] J. K. Lee and C. D. Han, "Evolution of polymer blend morphology during compounding in an internal mixer," *Polymer*, vol. 40, November 1999, pp. 6277-6296.

[4] H. Gao, H. Tan, W. Zhang, K. Morton, and S. Y. Chou, "Air Cushion Press for Excellent Uniformity, High Yield, and Fast Nanoimprint Across a 100 mm Field," *Nano Letters*, vol. 6, September 2006, pp. 2438-2441.

[5] K. Deguchi, N. Takeuchi, and A. Shimizu, "Evaluation of pressure uniformity using a pressure-sensitive film and calculation of wafer distortions caused by mold press in imprint lithography," *Japanese Journal of Applied Physics, Part 1: Regular Papers and Short Notes and Review Papers*, vol. 41, 2002, pp. 4178-4181.

[6] S. Timoshenko, *Theory of Plates and Shells*, New York: McGraw-Hill, 1959.

[7] J. N. Reddy, *Theory and Analysis of Elastic Plates and Shells*, Boca Raton, Fla.: CRC, 2007.
[8] D. Suh, S. Choi, and H. H. Lee, "Rigiflex lithography for nanostructure transfer," *Advanced Materials*, vol. 17, 2005, pp. 1554-1560.
[9] G. McClelland, C. Rettner, M. Hart, K. Carter, M. Sanchez, M. Best, and B. Terris, "Contact mechanics of a flexible imprinter for photocured nanoimprint lithography," *Tribology Letters*, vol. 19, 2005, pp. 59-63.
[10] R. H. Pedersen, O. Hansen, and A. Kristensen, "A compact system for large-area thermal nanoimprint lithography using smart stamps," *Journal of Micromechanics and Microengineering*, vol. 18, 2008, 055018.
[11] H. Hocheng and W. H. Hsu, "Effect of Back Mold Grooves on Improving Uniformity in Nanoimprint Lithography," *Japanese Journal of Applied Physics*, vol. 46, 2007, pp. 6370-6372.
[12] T. Nielsen, A. Kristensen, and O. Hansen, "Flexible Nano-Imprint Stamp," U.S. patent application Ser. No. 11/574,645, 2005.
[13] M. Colburn, A. Grot, B. J. Choi, M. Amistoso, T. Bailey, S. V. Sreenivasan, J. G. Ekerdt, and C. G. Willson, "Patterning nonflat substrates with a low pressure, room temperature, imprint lithography process," *Journal of Vacuum Science and Technology B: Microelectronics and Nanometer Structures*, vol. 19, 2001, pp. 2162-2172.
[14] H. K. Taylor and D. S. Boning, "Towards nanoimprint lithography-aware layout design checking," Proc. SPIE, vol. 7641, 764129, 2010.

What is claimed is:

1. A method of embossing with a stamp a deformable body comprising a deformable layer on a substrate, the method comprising:
running a deformation model based on convolving a contact pressure distribution with a mechanical response of a surface topography of the deformable layer and convolving the contact pressure distribution with a point load response of the stamp; and
embossing the deformable body using the stamp as a function of the deformation model.

2. The method of claim 1 wherein the deformation model is further based on convolving the contact pressure distribution with a point load response of the substrate.

3. The method of claim 1 further including determining the point load response of the stamp based on bending of the stamp.

4. The method of claim 3 further including determining the bending of the stamp based on thickness of the stamp.

5. The method of claim 4 further including determining the bending of the stamp based on elasticity of the stamp.

6. The method of claim 3 further including determining the point load response of the stamp based on indentation of the stamp.

7. The method of claim 1 wherein the deformable body includes a polymeric layer comparable in thickness to lateral dimensions of features being embossed.

8. The method of claim 1 wherein the deformable body includes a polymeric layer of thickness substantially less than lateral dimensions of features being embossed.

9. The method of claim 1 further including determining the contact pressure distribution based on elastic deflections of stamp and substrate.

10. The method of claim 1 further including determining the contact pressure distribution based on stamp indentation and substrate indentation.

11. The method of claim 1 further including determining the contact pressure history distribution based on deformations of a layer of the deformable body.

12. The method of claim 1 further including determining the contact pressure distribution based on a zero-mean pressure distribution needed to bring all surfaces of the layer of the deformable body into contact with the stamp.

13. The method of claim 1 further including determining the contact pressure distribution based on a zero-mean pressure distribution needed for an incremental displacement of the stamp into the deformable body.

14. The method of claim 1 further including determining the contact pressure distribution based on a spatial variation of thickness of the layer of the deformable body.

15. The method of claim 1 further including determining the contact pressure distribution based on the point load response and an average pressure applied to the stamp.

16. The method of claim 1 further including determining the mechanical response of the surface topography of the deformable body based on an average layer thickness of layers of the deformable body.

17. The method of claim 1 wherein the mechanical response of the surface topography of the deformable body is anisotropic.

18. The method of claim 1 wherein the mechanical response of the surface topography is a spatial response.

19. The method of claim 18 wherein the mechanical response of the surface topography is a temporal response.

* * * * *